(12) United States Patent
Finlay et al.

(10) Patent No.: US 11,936,866 B2
(45) Date of Patent: Mar. 19, 2024

(54) METHOD AND DATA PROCESSING SYSTEM FOR LOSSY IMAGE OR VIDEO ENCODING, TRANSMISSION AND DECODING

(71) Applicant: DEEP RENDER LTD, London (GB)

(72) Inventors: Chris Finlay, London (GB); Christian Besenbruch, London (GB); Jan Xu, London (GB); Bilal Abbasi, London (GB); Christian Etmann, London (GB); Arsalan Zafar, London (GB); Sebastjan Cizel, London (GB); Vira Koshkina, London (GB)

(73) Assignee: DEEP RENDER LTD., London (GB)

(*) Notice: Subject to any disclaimer, the term of this patent is extended or adjusted under 35 U.S.C. 154(b) by 0 days.

(21) Appl. No.: 18/458,497

(22) Filed: Aug. 30, 2023

(65) Prior Publication Data

US 2024/0007631 A1 Jan. 4, 2024

Related U.S. Application Data

(63) Continuation of application No. PCT/EP2023/060837, filed on Apr. 25, 2023.

(30) Foreign Application Priority Data

Apr. 25, 2022 (GB) ..................................... 2206022
Apr. 27, 2022 (GB) ..................................... 2206119
(Continued)

(51) Int. Cl.
*H04N 19/12* (2014.01)
*H04N 19/124* (2014.01)
(Continued)

(52) U.S. Cl.
CPC ........... *H04N 19/12* (2014.11); *H04N 19/124* (2014.11); *H04N 19/132* (2014.11);
(Continued)

(58) Field of Classification Search
CPC .... H04N 19/12; H04N 19/124; H04N 19/132; H04N 19/172; H04N 19/182; H04N 19/42; H04N 19/625; H04N 19/63; H04N 19/88
See application file for complete search history.

(56) References Cited

U.S. PATENT DOCUMENTS

2020/0027247 A1* 1/2020 Minnen ................... G06T 9/002
2020/0387750 A1* 12/2020 Shcherbinin .......... G06T 3/4053
(Continued)

FOREIGN PATENT DOCUMENTS

WO 2022084702 A1 4/2022

OTHER PUBLICATIONS

Balle, et al., Variational image compression with a scale hyperprior. arXiv preprint arXiv: 1802.01436 (2018).
(Continued)

*Primary Examiner* — Fabio S Lima
(74) *Attorney, Agent, or Firm* — Saul Ewing LLP

(57) ABSTRACT

A method for lossy video encoding, transmission and decoding, the method comprising the steps of: receiving an input video at a first computer system; encoding an input frame of the input video to produce a latent representation; producing a quantized latent; producing a hyper-latent representation; producing a quantized hyper-latent; entropy encoding the quantized latent; transmitting the entropy encoded quantized latent and the quantized hyper-latent to a second computer system; decoding the quantized hyper-latent to produce a set of context variables, wherein the set of context variables comprise a temporal context variable; entropy decoding the entropy encoded quantized latent using the set of context variables to obtain an output quantized latent; and decoding
(Continued)

the output quantized latent to produce an output frame, wherein the output frame is an approximation of the input frame.

20 Claims, 15 Drawing Sheets

(30) Foreign Application Priority Data

| May 18, 2022 | (GB) | ...................................... | 2207265 |
| Jul. 1, 2022 | (GB) | ...................................... | 2209725 |
| Jul. 1, 2022 | (GB) | ...................................... | 2209726 |

(51) Int. Cl.
*H04N 19/132* (2014.01)
*H04N 19/172* (2014.01)
*H04N 19/182* (2014.01)
*H04N 19/42* (2014.01)
*H04N 19/625* (2014.01)
*H04N 19/63* (2014.01)
*H04N 19/88* (2014.01)

(52) U.S. Cl.
CPC ......... *H04N 19/172* (2014.11); *H04N 19/182* (2014.11); *H04N 19/42* (2014.11); *H04N 19/625* (2014.11); *H04N 19/63* (2014.11); *H04N 19/88* (2014.11)

(56) References Cited

U.S. PATENT DOCUMENTS

| 2022/0215265 | A1* | 7/2022 | Jiang | ..................... G06N 3/084 |
| 2023/0156207 | A1* | 5/2023 | Yang | ................... H04N 19/174 |
| | | | | 375/240.03 |
| 2023/0336382 | A1* | 10/2023 | Huangfu | ................. G06N 3/02 |

OTHER PUBLICATIONS

Li, et al., "Deep Contextual Video Compression" 35th Conf. Neural Information Processing Systems, Sep. 30, 2021.
Li, et al., "Hybrid Spatial-Temporal Entropy Modelling for Neural Video Compression," 35th Conf. on Neural Information Processing Systems, Sep. 30, 2021.
Liu, et al., "Neural Video Coding using Multiscale Motion Compensation and Spatiotemporal Context Model," Jul. 9, 2020.
Ronneberger, et al., U-Net: Convolutional Networks for Biomedical Image Segmentation. ArXiv abs/1505.04597 (2015): n. pag.

* cited by examiner

METHOD AND DATA PROCESSING SYSTEM FOR LOSSY IMAGE OR VIDEO ENCODING, TRANSMISSION AND DECODING

CROSS-REFERENCE TO RELATED APPLICATIONS

This application is a continuation of International Application No. PCT/EP2023/060837, filed Apr. 25, 2023, which claims priority to GB Application No. 2206022.2, filed on Apr. 25, 2022; GB Application No. 2206119.6, filed on Apr. 27, 2022; GB Application No. 2207265.6, filed on May 18, 2022; GB Application No. 2209725.7, filed on Jul. 1, 2022; and GB Application No. 2209726.5, filed on Jul. 1, 2022, the entire contents of which being fully incorporated herein by reference.

FIELD OF THE INVENTION

This invention relates to a method and system for lossy image or video encoding, transmission and decoding, a method, apparatus, computer program and computer readable storage medium for lossy image or video encoding and transmission, and a method, apparatus, computer program and computer readable storage medium for lossy image or video receipt and decoding.

There is increasing demand from users of communications networks for images and video content. Demand is increasing not just for the number of images viewed, and for the playing time of video; demand is also increasing for higher resolution content. This places increasing demand on communications networks and increases their energy use because of the larger amount of data being transmitted.

To reduce the impact of these issues, image and video content is compressed for transmission across the network. The compression of image and video content can be lossless or lossy compression. In lossless compression, the image or video is compressed such that all of the original information in the content can be recovered on decompression. However, when using lossless compression there is a limit to the reduction in data quantity that can be achieved. In lossy compression, some information is lost from the image or video during the compression process. Known compression techniques attempt to minimise the apparent loss of information by the removal of information that results in changes to the decompressed image or video that is not particularly noticeable to the human visual system.

Artificial intelligence (AI) based compression techniques achieve compression and decompression of images and videos through the use of trained neural networks in the compression and decompression process. Typically, during training of the neutral networks, the difference between the original image and video and the compressed and decompressed image and video is analyzed and the parameters of the neural networks are modified to reduce this difference while minimizing the data required to transmit the content. However, AI based compression methods may achieve poor compression results in terms of the appearance of the compressed image or video or the amount of information required to be transmitted.

According to the present invention there is provided a method for lossy video encoding, transmission and decoding, the method comprising the steps of: receiving an input video at a first computer system; encoding an input frame of the input video using a first trained neural network to produce a latent representation; performing a quantization process on the latent representation to produce a quantized latent; encoding the latent representation using a second trained neural network to produce a hyper-latent representation; performing a quantization process on the hyper-latent representation to produce a quantized hyper-latent; entropy encoding the quantized latent; transmitting the entropy encoded quantized latent and the quantized hyper-latent to a second computer system; decoding the quantized hyper-latent using a third trained neural network to produce a set of context variables, wherein the set of context variables comprise a temporal context variable; entropy decoding the entropy encoded quantized latent using the set of context variables to obtain an output quantized latent; and decoding the output quantized latent using a fourth trained neural network to produce an output frame, wherein the output frame is an approximation of the input frame.

During the entropy decoding of the entropy encoded quantized latent, the temporal context variable may be applied to a previously decoded output quantized latent to obtain temporal context that is used to obtain the output quantized latent.

The set of context variables may further comprise a spatial context variable, wherein the spatial context variable is applied to a previously decoded section of the output quantized latent to obtain spatial context that is used during the decoding of the output quantized latent.

The temporal context variable may be a temporal context matrix.

The spatial context variable may be a spatial context matrix.

The spatial context variable may be used to solve an implicit equation to obtain the output quantized latent.

The temporal context variable may be additionally used when solving the implicit equation to obtain the output quantized latent.

The temporal context may be added to the solution of the implicit equation to obtain the output quantized latent.

The relative contributions of the temporal context and spatial context used to obtain the output quantized latent may be weighted.

The temporal context variable may be used to obtain one or more parameters of a fifth neural network; and the fifth neural network may be applied to a previously decoded output quantized latent to obtain temporal context that is used to obtain the output quantized latent.

The temporal context variable may comprise a first component and a second component; the first component may be applied to a downsampled previously decoded output quantized latent to produce downsampled temporal context; and the second component may be applied to an upsampling of the downsampled temporal context to obtain temporal context that is used to obtain the output quantized latent.

The temporal context variable may comprise optical flow vectors.

The method may be repeated for a plurality of input frames to obtain a plurality of output frames which are used to obtain an output video.

According to the present invention there is provided a method of training one or more neural networks, the one or more neural networks being for use in lossy video encoding, transmission and decoding, the method comprising the steps of: receiving a latent representation of a frame of an input training video; performing a quantization process on the latent representation to produce a quantized latent; encoding the latent representation using a first neural network to produce a hyper-latent representation; performing a quantization process on the hyper-latent representation to produce a quantized hyper-latent; entropy encoding the quantized latent; decoding the quantized hyper-latent using a second neural network to produce a set of context variables, wherein the set of context variables comprise a temporal context variable; entropy decoding the entropy encoded quantized latent using the set of context variables to obtain an output quantized latent; evaluating a loss function based on the rate of entropy encoding and decoding process; evaluating a gradient of the loss function; back-propagating the gradient of the loss function through the first neural network and the second neural network to update the parameters of the first neural network and the second neural network; and repeating the above steps using a first set of latent representations to produce a first trained neural network and a second trained neural network.

The method may further comprise the steps of, for each of the set of latent representations: receiving an input training video at a first computer system; encoding an input frame of the input training video using a third trained neural network to produce the latent representation; and decoding the output quantized latent using a fourth trained neural network to produce an output frame, wherein the output frame is an approximation of the input frame;

The method may further comprise the steps of, for each of the set of latent representations: receiving an input training video at a first computer system; encoding an input frame of the input training video using a third neural network to produce the latent representation; decoding the output quantized latent using a fourth neural network to produce an output frame, wherein the output frame is an approximation of the input frame; wherein the loss function is further based on a difference between the input frame and the output frame; and back-propagation of the gradient of the loss function additionally takes place through the third neural network and the fourth neural network to update the parameters of the third neural network and the fourth neural network to produce a third trained neural network and a fourth trained neural network.

During the entropy decoding of the entropy encoded quantized latent, the temporal context variable may be applied to a previously decoded output quantized latent to obtain temporal context that is used to obtain the output quantized latent.

The set of context variables may further comprise a spatial context variable, wherein the spatial context variable is applied to a previously decoded section of the output quantized latent to obtain spatial context that is used during the decoding of the output quantized latent.

The relative contributions of the temporal context and spatial context used to obtain the output quantized latent may be weighted; and back-propagation of the gradient of the loss function may additionally update the weighting of the relative contributions of the temporal context and spatial context used to obtain the output quantized latent.

SUMMARY OF THE INVENTION

According to the present invention there is provided a method for lossy video encoding and transmission, the method comprising the steps of: receiving an input video at a first computer system; encoding an input frame of the input video using a first trained neural network to produce a latent representation; performing a quantization process on the latent representation to produce a quantized latent; encoding the latent representation using a second trained neural network to produce a hyper-latent representation; performing a quantization process on the hyper-latent representation to produce a quantized hyper-latent; entropy encoding the quantized latent; and transmitting the entropy encoded quantized latent and the quantized hyper-latent.

According to the present invention there is provided a method for lossy image or video receipt and decoding, the method comprising the steps of: receiving the entropy encoded quantized latent and the quantized hyper-latent transmitted according to the method for lossy video encoding and transmission at a second computer system; decoding the quantized hyper-latent using a third trained neural network to produce a set of context variables, wherein the set of context variables comprise a temporal context variable; entropy decoding the entropy encoded quantized latent using the set of context variables to obtain an output quantized latent; and decoding the output quantized latent using a fourth trained neural network to produce an output frame, wherein the output frame is an approximation of the input frame.

According to the present invention there is provided a data processing system configured to perform the methods above.

According to the present invention there is provided a data processing apparatus configured to perform the methods above.

According to the present invention there is provided a computer program comprising instructions which, when the program is executed by a computer, cause the computer to carry out the methods above.

According to the present invention there is provided a computer-readable storage medium comprising instructions which, when executed by a computer, cause the computer to carry out the methods above.

According to the present invention there is provided a method for lossy video encoding, transmission and decoding, the method comprising the steps of: receiving a plurality of frames of a video at a first computer system; encoding the plurality of frames using a first trained neural network to produce a plurality of latent representations; concatenating at least two of the plurality of latent representations to obtain a latent representation subset; encoding the latent representation subset using a second trained neural network to produce a hyper-latent representation; performing a quantization process on the latent representation to produce a quantized latent and the hyper-latent representation to produce a quantized hyper-latent; transmitting the quantized latent and the quantized hyper-latent to a second computer system; decoding the quantized hyper-latent using a third trained neural network; and decoding the quantized latent using the output of the third trained neural network and a fourth trained neural network to produce a plurality of output frames, wherein the plurality of output frames are an approximation of the plurality of frames of the video.

At least one of the second trained neural network and the third trained neural network may comprise a convolution operation performed in at least three dimensions.

The first trained neural network and the fourth trained neural network may comprise only convolution operations performed in two dimensions.

Optical flow vectors of the at least two latent representations may be additionally determined and included in the latent representation subset.

According to the present invention there is provided a method for lossy video encoding, transmission and decoding, the method comprising the steps of: receiving a plurality of frames of a video at a first computer system; concatenating at least two frames of the plurality of frames to obtain a video subset; encoding the video subset using a first trained neural network to produce a latent representation; performing a quantization process on the latent representation to produce a quantized latent; transmitting the quantized latent to a second computer system; and decoding the quantized latent using a second trained neural network to produce an output video subset, wherein the output video subset is an approximation of the video subset.

The method may further comprise the steps of: encoding the latent representation using a third trained neural network to produce a hyper-latent representation; performing a quantization process on the hyper-latent representation to produce a quantized hyper-latent; transmitting the quantized hyper-latent to the second computer system; and decoding the quantized hyper-latent using a fourth trained neural network; wherein the output of the fourth trained neural network is used during the decoding of the quantized latent.

The method may further comprise the steps of: encoding at least one further video subset using the first trained neural network to produce at least one further latent representation; concatenating at least two of the plurality of latent representations to obtain a latent representation subset; encoding the latent representation subset using a third trained neural network to produce a hyper-latent representation; performing a quantization process on the hyper-latent representation to produce a quantized hyper-latent; transmitting the quantized hyper-latent to the second computer system; and decoding the quantized hyper-latent using a fourth trained neural network; wherein the output of the fourth trained neural network is used during the decoding of the quantized latent.

At least one of the first trained neural network and the second trained neural network may comprise a convolution operation performed in at least three dimensions.

According to the present invention there is provided a method for lossy video encoding, transmission and decoding, the method comprising the steps of: receiving a plurality of frames of a video at a first computer system; encoding the plurality of frames using a first trained neural network to produce a plurality of latent representations; encoding the plurality of latent representations using a second trained neural network to produce a plurality of hyper-latent representations; performing a quantization process on the plurality of latent representations to produce a plurality of quantized latents and the plurality of hyper-latent representations to produce a plurality of quantized hyper-latents; transmitting the plurality of quantized latents and the plurality of quantized hyper-latents to a second computer system; concatenating at least two of the plurality of quantized hyper-latents to obtain a quantized hyper-latent subset; decoding the quantized hyper-latent subset using a third trained neural network; and decoding the plurality of quantized latents using the output of the third trained neural network and a fourth trained neural network to produce a plurality of output frames, wherein the plurality of output frames are an approximation of the plurality of frames of the video.

According to the present invention there is provided a method of training one or more neural networks, the one or more neural networks being for use in lossy video encoding, transmission and decoding, the method comprising the steps of: receiving a plurality of frames of a video at a first computer system; encoding the plurality of frames using a first neural network to produce a plurality of latent representations; concatenating at least two of the plurality of latent representations to obtain a latent representation subset; encoding the latent representation subset using a second neural network to produce a hyper-latent representation; performing a quantization process on the latent representation to produce a quantized latent and the hyper-latent representation to produce a quantized hyper-latent; transmitting the quantized latent and the quantized hyper-latent to a second computer system; decoding the quantized hyper-latent using a third neural network; and decoding the quantized latent using the output of the third neural network and a fourth neural network to produce a plurality of output frames; evaluating a loss function based on a difference between the plurality of frames and the plurality of output frames; evaluating a gradient of the loss function; back-propagating the gradient of the loss function through the first, second, third and fourth neural network to update the parameters of the first, second, third and fourth neural network; and repeating the above steps using a plurality of sets of frames to produce a first, second, third and fourth trained neural network.

According to the present invention there is provided a method for lossy video encoding and transmission, the method comprising the steps of: receiving a plurality of frames of a video at a first computer system; encoding the plurality of frames using a first trained neural network to produce a plurality of latent representations; concatenating at least two of the plurality of latent representations to obtain a latent representation subset; encoding the latent representation subset using a second trained neural network to produce a hyper-latent representation; performing a quantization process on the latent representation to produce a quantized latent and the hyper-latent representation to produce a quantized hyper-latent; transmitting the quantized latent and the quantized hyper-latent.

According to the present invention there is provided a method for lossy image or video receipt and decoding, the method comprising the steps of: receiving the quantized latent and the quantized hyper-latent transmitted according to the method of claim 36 at a second computer system; decoding the quantized hyper-latent using a third trained neural network; and decoding the quantized latent using the output of the third trained neural network and a fourth trained neural network to produce a plurality of output frames, wherein the plurality of output frames are an approximation of the plurality of frames of the video.

According to the present invention there is provided a data processing system configured to perform the methods above.

According to the present invention there is provided a data processing apparatus configured to perform the methods above.

According to the present invention there is provided a computer program comprising instructions which, when the program is executed by a computer, cause the computer to carry out the methods above.

According to the present invention there is provided a computer-readable storage medium comprising instructions which, when executed by a computer, cause the computer to carry out the methods above.

According to the present invention there is provided a method for lossy image or video encoding, transmission and decoding, the method comprising the steps of: receiving an input image at a first computer system; encoding the input image using a first trained neural network to produce a latent representation; performing a quantization process on the latent representation to produce a quantized latent; transmitting the quantized latent to a second computer system; and decoding the quantized latent using a second trained neural network to produce an output image, wherein the output frame is an approximation of the input image; wherein at least one of the first trained neural network and the second trained neural network comprises a convolution operation performed in at least three dimensions.

The method may further comprise the steps of: encoding the latent representation using a third trained neural network to produce a hyper-latent representation; performing a quantization process on the hyper-latent representation to produce a quantized hyper-latent; transmitting the quantized hyper-latent to the second computer system; and decoding the quantized hyper-latent using a fourth trained neural network; wherein the output of the fourth trained neural network is used during the decoding of the quantized latent; and at least one of the third trained neural network and the fourth trained neural network comprises a convolution operation performed in at least three dimensions.

According to the present invention there is provided a method for lossy video encoding, transmission and decoding, the method comprising the steps of: receiving an input video at a first computer system; encoding an input frame of the input video using a first trained neural network to produce a latent representation; performing a quantization process on the latent representation to produce a quantized latent; encoding the latent representation using a second trained neural network to produce a hyper-latent representation; performing a quantization process on the hyper-latent representation to produce a quantized hyper-latent; transmitting the quantized latent and the quantized hyper-latent to the second computer system; decoding the quantized hyper-latent using a third trained neural network; and decoding the quantized latent using the output of the third trained neural network and a fourth trained neural network to produce an output frame, wherein the output frame is an approximation of the input frame; wherein at least one of the second trained neural network and the third trained neural network comprises a convolution operation performed in at least three dimensions.

The convolution operation performed in at least three dimensions may comprise a plurality of convolution operations performed in two dimensions; wherein the plurality of convolution operations performed in two dimensions produce an equivalent output to a single convolution operation performed in at least three dimensions.

According to the present invention there is provided a method for image or video encoding, transmission and decoding, the method comprising the steps of: receiving an input image at a first computer system; processing the input image using a first trained neural network to produce an intermediate image, where the intermediate image is an approximation of the input image; encoding and transmitting the intermediate image to a second computer system; and decoding the intermediate image at the second computer system to produce an output image.

The encoding, transmission and decoding of the intermediate image may comprise a lossless compression process.

The encoding, transmission and decoding of the intermediate image to obtain the output image may comprise the steps of: encoding the intermediate image using a second trained neural network to produce a latent representation; performing a quantization process on the latent representation to produce a quantized latent; transmitting the quantized latent to the second computer system; and decoding the quantized latent using a third trained neural network to produce the output image, wherein the output image is an approximation of the input image.

The method may further comprise the steps of: encoding the latent representation using a fourth trained neural network to produce a hyper-latent representation; performing a quantization process on the hyper-latent representation to produce a quantized hyper-latent; transmitting the quantized hyper-latent to the second computer system; and decoding the quantized hyper-latent using a fifth trained neural network, wherein the output of the fifth trained neural network is used during the decoding of the quantized latent.

The first trained neural network may be a U-Net.

The first trained neural network may comprise a convolution operation performed in at least three dimensions.

At least one of the fourth and fifth trained neural networks may comprise a convolution operation performed in at least three dimensions.

The first trained neural network may be selected from a plurality of trained neural networks based on a predetermined quality value.

At least two of the plurality of trained neural networks may have different numbers of layers.

According to the present invention there is provided a method of training one or more neural networks, the one or more neural networks being for use in image or video encoding, transmission and decoding, the method comprising the steps of: receiving an input image at a first computer system; processing the input image using a first neural network to produce an intermediate image, where the intermediate image is an approximation of the input image; encoding and transmitting the intermediate image to a second computer system; decoding the intermediate image at the second computer system to produce an output image; evaluating a loss function based on a difference between the input image and the output image; evaluating a gradient of the loss function; back-propagating the gradient of the loss function through the first neural network to update the parameters of the first neural network; and repeating the above steps using a first set of training images to produce a first trained neural network.

The loss function may be additionally based on a difference between the input image and the intermediate image.

The encoding, transmission and decoding of the intermediate image to obtain the output image may comprise the steps of: encoding the intermediate image using a second trained neural network to produce a latent representation; performing a quantization process on the latent representation to produce a quantized latent; transmitting the quantized latent to the second computer system; and decoding the quantized latent using a third trained neural network to produce the output image; wherein back-propagation of the gradient of the loss function additionally takes place through the second neural network and the third neural network to update the parameters of the second neural network and the third neural network to produce a second trained neural network and a third trained neural network.

According to the present invention there is provided a method for lossy video encoding, transmission and decoding, the method comprising the steps of: receiving an input video at a first computer system; encoding an input frame of the input video using a first trained neural network to produce a latent representation; performing a quantization process on the latent representation to produce a quantized latent; transmitting the quantized latent to a second computer system; processing the quantized latent using a second trained neural network to produce a processed latent representation; and decoding the processed latent representation using a third trained neural network to produce an output frame, wherein the output frame is an approximation of the input frame.

The method may further comprise the steps of: encoding the latent representation using a fourth trained neural network to produce a hyper-latent representation; performing a quantization process on the hyper-latent representation to produce a quantized hyper-latent; transmitting the quantized hyper-latent to the second computer system; decoding the quantized hyper-latent using a fifth trained neural network to produce a temporal context variable; applying the temporal context variable to a previously obtained processed latent representation to obtain temporal context; and applying the temporal context to the processed latent representation to obtain a corrected processed latent representation; wherein the corrected processed latent representation is decoded by the third trained neural network to produce the output frame.

The temporal context variable may be a temporal context matrix.

The method may further comprise the steps of: entropy encoding the quantized latent prior to transmitting the quantized latent to the second computer system; encoding the latent representation using a sixth trained neural network to produce a further hyper-latent representation; performing a quantization process on the further hyper-latent representation to produce a further quantized hyper-latent; transmitting the further quantized hyper-latent to the second computer system; decoding the further quantized hyper-latent using a seventh trained neural network to produce a set of context variables; entropy decoding the entropy encoded quantized latent using the set of context variables to obtain the quantized latent processed by the second trained neural network.

The set of context variables may comprise a further temporal context variable; and during the entropy decoding of the entropy encoded quantized latent, the further temporal context variable is applied to a previously decoded quantized latent to obtain further temporal context that is used to obtain the quantized latent.

The further temporal context variable may be a further temporal context matrix.

The temporal context may be added to the processed latent representation to obtain the corrected processed latent representation.

According to the present invention there is provided a method of training one or more neural networks, the one or more neural networks being for use in image or video encoding, transmission and decoding, the method comprising the steps of: receiving an input video at a first computer system; encoding an input frame of the input video using a first neural network to produce a latent representation; performing a quantization process on the latent representation to produce a quantized latent; processing the quantized latent using a second neural network to produce a processed latent representation; and decoding the processed latent representation using a third neural network to produce an output frame, wherein the output frame is an approximation of the input frame. evaluating a loss function based on a difference between the input frame and the output frame; evaluating a gradient of the loss function; back-propagating the gradient of the loss function through the first neural network and the third neural network to update the parameters of the first neural network and the third neural network; and repeating the above steps using a first set of training videos to produce a first trained neural network and a third trained neural network.

The gradient of the loss function may be additionally back-propagated through the second neural network to update the parameters of the second neural network to produce a second trained neural network.

According to the present invention there is provided a method for lossy image or video encoding, transmission and decoding, the method comprising the steps of: receiving an input image at a first computer system; encoding the input image using a first trained neural network to produce a latent representation; performing a quantization process on the latent representation to produce a quantized latent; transmitting the quantized latent to the second computer system; decoding the quantized latent using a second trained neural network to produce an intermediate image; and processing the intermediate image using a third trained neural network to produce an output image, wherein the output image is an approximation of the input image.

The output image may be an approximation of the intermediate image.

The method may further comprising the steps of: encoding the latent representation using a fourth trained neural network to produce a hyper-latent representation; performing a quantization process on the hyper-latent representation to produce a quantized hyper-latent; transmitting the quantized hyper-latent to the second computer system; and decoding the quantized hyper-latent using a fifth trained neural network, wherein the output of the fifth trained neural network is used during the decoding of the quantized latent.

The third trained neural network may be a U-Net.

The third trained neural network may comprise a convolution operation performed in at least three dimensions.

At least one of the fourth and fifth trained neural networks may comprise a convolution operation performed in at least three dimensions.

The third trained neural network may be selected from a plurality of trained neural networks based on a predetermined quality value.

At least two of the plurality of trained neural networks have different numbers of layers.

According to the present invention there is provided a method of training one or more neural networks, the one or more neural networks being for use in image or video encoding, transmission and decoding, the method comprising the steps of: receiving an input image at a first computer system; encoding the input image using a first neural network to produce a latent representation; performing a quantization process on the latent representation to produce a quantized latent; transmitting the quantized latent to the second computer system; decoding the quantized latent using a second neural network to produce an intermediate image; and processing the intermediate image using a third neural network to produce an output image, wherein the output image is an approximation of the input image; evaluating a loss function based on a difference between the input image and the output image; evaluating a gradient of the loss function; back-propagating the gradient of the loss function through the first, second and third neural network to update the parameters of the first, second and third neural network; and repeating the above steps using a first set of training images to produce a first, second and third trained neural network.

The loss function may be additionally based on a difference between the output image and the intermediate image.

According to the present invention there is provided a method for lossy image or video encoding, transmission and decoding, the method comprising the steps of: receiving an input image at a first computer system; encoding the input image using a first trained neural network to produce a latent representation; performing a quantization process on the latent representation to produce a quantized latent; transmitting the quantized latent to a second computer system; and decoding the quantized latent using a second trained neural network to produce an output image, wherein the output image is an approximation of the input image;

wherein at least one of the first trained neural network and the second neural network comprises an anti-aliasing filtering operation.

The method may further comprise the steps of: encoding the latent representation using a third trained neural network to produce a hyper-latent representation; performing a quantization process on the hyper-latent representation to produce a quantized hyper-latent; transmitting the quantized hyper-latent to the second computer system; and decoding the quantized hyper-latent using a fourth trained neural network; wherein the output of the fourth trained neural network is used during the decoding of the quantized latent; and at least one of the third trained neural network and the fourth neural network comprises an anti-aliasing filtering operation.

According to the present invention there is provided a method for lossy image or video encoding, transmission and decoding, the method comprising the steps of: receiving an input image at a first computer system; encoding the input image using a first trained neural network to produce a latent representation; encoding the latent representation using a second trained neural network to produce a hyper-latent representation; performing a quantization process on the latent representation to produce a quantized latent and on the hyper-latent representation to produce a quantized hyper-latent; transmitting the quantized latent and the quantized hyper-latent to a second computer system; decoding the quantized hyper-latent using a third trained neural network; decoding the quantized latent using the output of the third trained neural network and a fourth trained neural network to produce an output image, wherein the output image is an approximation of the input image; wherein at least one of the second trained neural network and the third neural network comprises an anti-aliasing filtering operation.

The anti-aliasing filtering operation may be a differentiable function.

The anti-aliasing filtering operation may comprise at least one of the following operations: a Kaiser-windowed sinc filter, a Gaussian filter and a Sum-of-cosines-windowed sinc filter.

According to the present invention there is provided a method of training one or more neural networks, the one or more neural networks being for use in lossy image or video encoding, transmission and decoding, the method comprising the steps of: receiving an input image at a first computer system; encoding the input image using a first neural network to produce a latent representation; performing a quantization process on the latent representation to produce a quantized latent; and decoding the quantized latent using a second neural network to produce an output image, wherein the output image is an approximation of the input image; evaluating a loss function based on a difference between the output image and the input image; evaluating a gradient of the loss function; back-propagating the gradient of the loss function through the first neural network and the second neural network to update the parameters of the first neural network and the second neural network; and repeating the above steps using a set of input images to produce a first trained neural network and a second trained neural network wherein at least one of the first neural network and the second neural network comprises an anti-aliasing filtering operation.

The anti-aliasing filtering operation may be defined by one or more parameters; and the one or more parameters of the anti-aliasing filtering operation are predetermined.

The anti-aliasing filtering operation may be defined by one or more parameters; and the one or more parameters of the anti-aliasing filtering operation are additionally updated during back propagation of the gradient of the loss function.

The difference between the output image and the input image may be determined by a third neural network acting as a discriminator; and the third neural network comprises an anti-aliasing filtering operation.

According to the present invention there is provided a method of training one or more neural networks, the one or more neural networks being for use in lossy image or video encoding, transmission and decoding, the method comprising the steps of: receiving an input image at a first computer system; encoding the input image using a first neural network to produce a latent representation; performing a quantization process on the latent representation to produce a quantized latent; and decoding the quantized latent using a second neural network to produce an output image, wherein the output image is an approximation of the input image; evaluating a loss function based on a difference between the output image and the input image; evaluating a gradient of the loss function; back-propagating the gradient of the loss function through the first neural network and the second neural network to update the parameters of the first neural network and the second neural network; and repeating the above steps using a set of input images to produce a first trained neural network and a second trained neural network; wherein the loss function additionally comprises a term based on a difference between a pre-transformed output and a post-transformed output; wherein the pre-transformed output is an output of an input-output pair of the method of training one or more neural networks where a transformation has been applied to the input; and the post-transformed output is an output of the input-output pair where a corresponding transformation to the transformation applied to obtain the pre-transformed output has been applied to the output.

The input-output pair may be the input image and the output image.

The input-output pair may be the input image and the latent representation.

The input-output pair may be the quantized latent received by the second computer system and the output image.

The method may further comprise the steps of: encoding the latent representation using a third neural network to produce a hyper-latent representation; performing a quantization process on the hyper-latent representation to produce a quantized hyper-latent; and decoding the quantized hyper-latent using a fourth neural network; wherein the output of the fourth trained neural network is used during the decoding of the quantized latent; and the input-output pair is the latent representation and the output of the fourth trained neural network.

The method may be repeated for a plurality of frames of an input video to obtain a plurality of output frames; and the input-output pair is the plurality of frames of the input video and the plurality of output frames.

The transformation and the corresponding transformation may be applied to a subset of the channels of the input-output pair.

The input of the input-output pair may be at a first resolution and the output of the input-output pair may be at a second resolution, where the first resolution and the second resolution are different; and the method may further comprise the following steps: prior to applying the transformation or corresponding transformation to the input or output with the smaller resolution, upsampling the smaller resolution input or output; and after applying the transformation or corresponding transformation to the upsampled input or output, downsampling the upsampled input or output.

The smaller resolution input or output may be upsampled to correspond to the resolution of the other of the input or output.

An anti-aliasing filtering operation may be applied to the upsampled input or output prior to applying the transformation or corresponding transformation.

An anti-aliasing filtering operation may be applied to the transformed upsampled input or output.

The transformation or corresponding transformation may comprise a basis change.

The basis change may be a bijection.

The basis change may comprise at least one of the following operations: a pixel shuffle upsample, a pixel shuffle downsample, a wavelet transform, an inverse wavelet transform, a discrete sine or cosine transformation, an inverse discrete sine or cosine transformation and a learnable invertible transformation.

The method may further comprise applying zero values to undefined pixels created in the input or output by applying the transformation or corresponding transformation.

The method may further comprise applying the value of adjacent defined pixels to undefined pixels created in the input or output by applying the transformation or corresponding transformation.

The transformation and the corresponding transformation may be identical.

The transformation may be different to the corresponding transformation.

The transformation and the corresponding transformation may be retained for each repetition of the method.

The transformation and the corresponding transformation may be selected from a random distribution for each repetition of the method.

According to the present invention there is provided a method of training one or more neural networks, the one or more neural networks being for use in lossy video encoding, transmission and decoding, the method comprising the steps of: receiving an input video at a first computer system; encoding a plurality of input frames of the input video using a first trained neural network to produce a plurality of latent representations; determining an optical flow field between at least two of the plurality of input frames; providing the optical flow field as an input to a second neural network to obtain a latent optical flow field; evaluating a loss function based on a difference between at least one of the plurality of latent representations and a corresponding predicted latent representation obtained using the latent optical flow field; evaluating a gradient of the loss function; back-propagating the gradient of the loss function through the second neural network to update the parameters of the second neural network; and repeating the above steps using a set of input videos to produce a second trained neural network.

The method may further comprise the steps of: decoding the at least one of the plurality of latent representations and the corresponding predicted latent representation using a third trained neural network to produce an output frame and a corresponding predicted output frame; wherein the difference between the least one of the plurality of latent representations and the corresponding predicted latent representation is based on a difference between the output frame and the corresponding predicted output frame.

The loss function may based on the difference between a binary mask of the least one of the plurality of latent representations and a binary mask of the corresponding predicted latent representation.

According to the present invention there is provided a method for lossy video encoding, transmission and decoding, the method comprising the use of one or more neural networks trained according to the methods above.

According to the present invention there is provided a method for lossy video encoding, transmission and decoding, the method comprising the steps of: receiving an input video at a first computer system; encoding an input frame of the input video using a first trained neural network to produce a latent representation; determining an optical flow field between the input frame and a previous frame of the input video; encoding the previous frame of the input video using the first trained neural network to produce a previous latent representation; decoding the previous latent representation using a second trained neural network to obtain a previous output frame, wherein the previous output frame is an approximation of the previous input frame; decoding the latent representation using the second trained neural network to obtain an output frame, wherein the output frame is an approximation of the input frame; determining a predicted output frame based on the optical flow field and the previous output frame; determining a difference between the predicted output frame and the output frame; transmitting the latent representation and the difference between the predicted output frame and the output frame to a second computer system; and decoding the latent representation using a third trained neural network and the difference between the predicted output frame and the output frame to produce a corrected output frame, wherein the corrected output frame is an approximation of the input frame.

The difference between the predicted output frame and the output frame may be encoded using a fourth trained neural network to obtain a latent difference; the latent difference is additionally transmitted to the second computer system; and the latent difference is decoded using a fifth trained neural network to obtain an approximation of the difference between the predicted output frame and the output frame used to obtain the corrected output frame.

The difference between the predicted output frame and the output frame may be added to the output of the third trained neural network to obtain the corrected output frame.

According to the present invention there is provided a method for lossy video encoding, transmission and decoding, the method comprising the steps of: receiving an input video at a first computer system; encoding an input frame of the input video using a first trained neural network to produce a latent representation; determining an optical flow field between the input frame and a previous frame of the input video; encoding the optical flow field using a second trained neural network to produce a latent flow field representation; transmitting the latent representation and the latent flow field representation to a second computer system; decoding the latent representation using a third trained neural network to obtain an output frame; decoding the latent flow field representation using a fourth trained neural network to obtain an approximation of the optical flow field; determining a difference based on the approximation of the optical flow field and a previous output frame, wherein the previous output frame corresponds to the previous frame of the input video; and applying the difference to the output frame to produce a corrected output frame, wherein the corrected output frame is an approximation of the input frame.

The previous frame may be an I-frame of the input video.

According to the present invention there is provided a method of training one or more neural networks, the one or more neural networks being for use in lossy video encoding, transmission and decoding, the method comprising the steps of: receiving an input video at a first computer system; encoding an input frame of the input video using a first neural network to produce a latent representation; determining an optical flow field of the input frame and a previous frame of the input video; encoding the previous frame of the input video using the first neural network to produce a previous latent representation; decoding the previous latent representation using a second neural network to produce a previous output frame; decoding the latent representation using the second neural network to produce an output frame, where the output frame is an approximation of the input frame; determining a predicted output frame based on the optical flow field and the previous output frame; determining a difference between the predicted output frame and the output frame; decoding the latent representation using a third neural network and the difference between the predicted output frame and the output frame to produce a corrected output frame, wherein the corrected output frame is an approximation of the input frame; evaluating a loss function based on a difference between the corrected output frame and the input frame; evaluating a gradient of the loss function; back-propagating the gradient of the loss function through the first, second and third neural network to update the parameters of the first, second and third neural network; and repeating the above steps using a set of input videos to produce a trained first, second and third neural network.

The difference between the predicted output frame and the output frame may be encoded using a fourth neural network to obtain a latent difference; and the latent difference is decoded using a fifth neural network to obtain an approximation of the difference between the predicted output frame and the output frame used to obtain the corrected output frame; the loss function additionally includes a term based on a difference between the difference between the predicted output frame and the output frame and the approximation of the difference between the predicted output frame and the output frame.

The loss function may additionally include a term based on the size of the difference between the predicted output frame and the output frame.

According to the present invention there is provided a data processing system configured to perform the methods above.

According to the present invention there is provided a computer program comprising instructions which, when the program is executed by a computer, cause the computer to carry out the methods above.

According to the present invention there is provided a computer-readable storage medium comprising instructions which, when executed by a computer, cause the computer to carry out the methods above.

BRIEF DESCRIPTION OF THE DRAWINGS

Aspects of the invention will now be described by way of examples, with reference to the following figures in which.

DETAILED DESCRIPTION OF THE INVENTION

Figure 1:
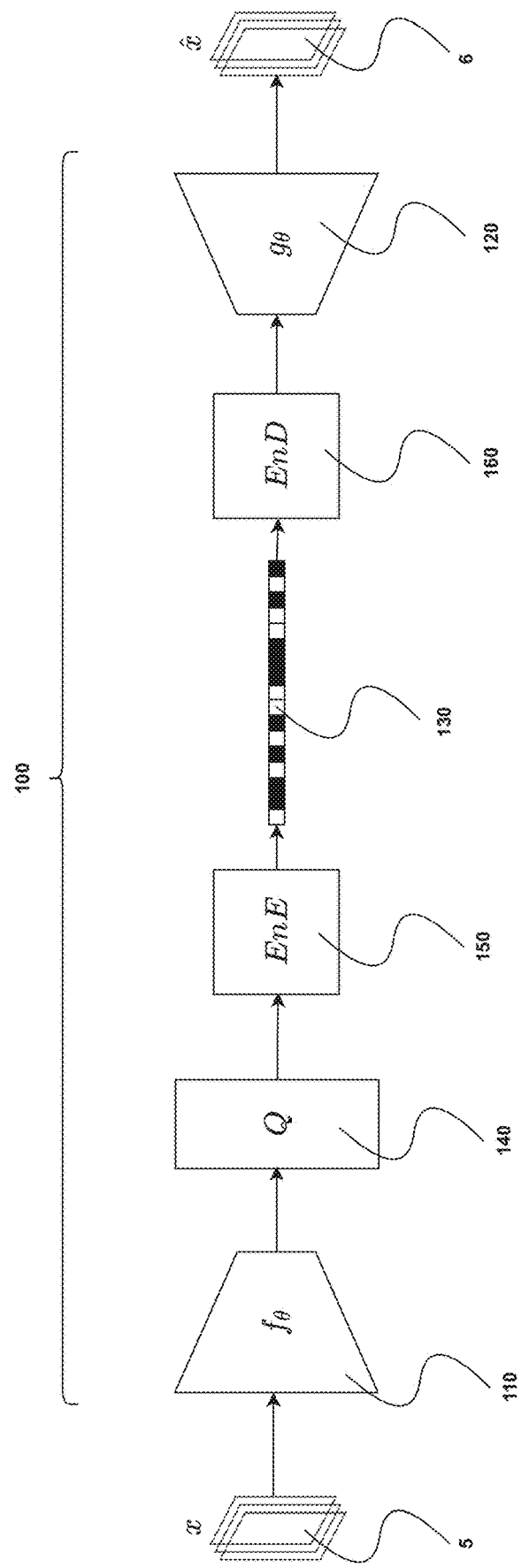
FIG. 1 illustrates an example of an image or video compression, transmission and decompression pipeline.

Compression processes may be applied to any form of information to reduce the amount of data, or file size, required to store that information. Image and video information is an example of information that may be compressed. The file size required to store the information, particularly during a compression process when referring to the compressed file, may be referred to as the rate. In general, compression can be lossless or lossy. In both forms of compression, the file size is reduced. However, in lossless compression, no information is lost when the information is compressed and subsequently decompressed. This means that the original file storing the information is fully reconstructed during the decompression process. In contrast to this, in lossy compression information may be lost in the compression and decompression process and the reconstructed file may differ from the original file. Image and video files containing image and video data are common targets for compression. JPEG, JPEG2000, AVC, HEVC and AVI are examples of compression processes for image and/or video files.

In a compression process involving an image, the input image may be represented as x. The data representing the image may be stored in a tensor of dimensions H×W×C, where H represents the height of the image, W represents the width of the image and C represents the number of channels of the image. Each H×W data point of the image represents a pixel value of the image at the corresponding location. Each channel C of the image represents a different component of the image for each pixel which are combined when the image file is displayed by a device. For example, an image file may have 3 channels with the channels representing the red, green and blue component of the image respectively. In this case, the image information is stored in the RGB colour space, which may also be referred to as a model or a format. Other examples of colour spaces or formats include the CMKY and the YCbCr colour models. However, the channels of an image file are not limited to storing colour information and other information may be represented in the channels. As a video may be considered a series of images in sequence, any compression process that may be applied to an image may also be applied to a video. Each image making up a video may be referred to as a frame of the video.

The output image may differ from the input image and may be represented by 2. The difference between the input image and the output image may be referred to as distortion or a difference in image quality. The distortion can be measured using any distortion function which receives the input image and the output image and provides an output which represents the difference between input image and the output image in a numerical way. An example of such a method is using the mean square error (MSE) between the pixels of the input image and the output image, but there are many other ways of measuring distortion, as will be known to the person skilled in the art. The distortion function may comprise a trained neural network.

Typically, the rate and distortion of a lossy compression process are related. An increase in the rate may result in a decrease in the distortion, and a decrease in the rate may result in an increase in the distortion. Changes to the distortion may affect the rate in a corresponding manner. A relation between these quantities for a given compression technique may be defined by a rate-distortion equation.

AI based compression processes may involve the use of neural networks. A neural network is an operation that can be performed on an input to produce an output. A neural network may be made up of a plurality of layers. The first layer of the network receives the input. One or more operations may be performed on the input by the layer to produce an output of the first layer. The output of the first layer is then passed to the next layer of the network which may perform one or more operations in a similar way. The output of the final layer is the output of the neural network.

Each layer of the neural network may be divided into nodes. Each node may receive at least part of the input from the previous layer and provide an output to one or more nodes in a subsequent layer. Each node of a layer may perform the one or more operations of the layer on at least part of the input to the layer. For example, a node may receive an input from one or more nodes of the previous layer. The one or more operations may include a convolution, a weight, a bias and an activation function. Convolution operations are used in convolutional neural networks. When a convolution operation is present, the convolution may be performed across the entire input to a layer. Alternatively, the convolution may be performed on at least part of the input to the layer.

Each of the one or more operations is defined by one or more parameters that are associated with each operation. For example, the weight operation may be defined by a weight matrix defining the weight to be applied to each input from each node in the previous layer to each node in the present layer. In this example, each of the values in the weight matrix is a parameter of the neural network. The convolution may be defined by a convolution matrix, also known as a kernel. In this example, one or more of the values in the convolution matrix may be a parameter of the neural network. The activation function may also be defined by values which may be parameters of the neural network. The parameters of the network may be varied during training of the network.

Other features of the neural network may be predetermined and therefore not varied during training of the network. For example, the number of layers of the network, the number of nodes of the network, the one or more operations performed in each layer and the connections between the layers may be predetermined and therefore fixed before the training process takes place. These features that are predetermined may be referred to as the hyperparameters of the network. These features are sometimes referred to as the architecture of the network.

To train the neural network, a training set of inputs may be used for which the expected output, sometimes referred to as the ground truth, is known. The initial parameters of the neural network are randomized and the first training input is provided to the network. The output of the network is compared to the expected output, and based on a difference between the output and the expected output the parameters of the network are varied such that the difference between the output of the network and the expected output is reduced. This process is then repeated for a plurality of training inputs to train the network. The difference between the output of the network and the expected output may be defined by a loss function. The result of the loss function may be calculated using the difference between the output of the network and the expected output to determine the gradient of the loss function. Back-propagation of the gradient descent of the loss function may be used to update the parameters of the neural network using the gradients $dL/dy$ of the loss function. A plurality of neural networks in a system may be trained simultaneously through back-propagation of the gradient of the loss function to each network.

In the case of AI based image or video compression, the loss function may be defined by the rate distortion equation. The rate distortion equation may be represented by Loss=D+ $\lambda^*R$, where D is the distortion function, $\lambda$ is a weighting factor, and R is the rate loss. $\lambda$ may be referred to as a lagrange multiplier. The langrange multiplier provides as weight for a particular term of the loss function in relation to each other term and can be used to control which terms of the loss function are favoured when training the network.

In the case of AI based image or video compression, a training set of input images may be used. An example training set of input images is the KODAK image set (for example at www.cs.albany.edu/xypan/research/snr/Kodak.html). An example training set of input images is the IMAX image set. An example training set of input images is the Imagenet dataset (for example at www.image-net.org/download). An example training set of input images is the CLIC Training Dataset P ("professional") and M ("mobile") (for example at http://challenge.compression.cc/tasks/).

An example of an AI based compression process 100 is shown in FIG. 1. As a first step in the AI based compression process, an input image 5 is provided. The input image 5 is provided to a trained neural network 110 characterized by a function $f_\theta$ acting as an encoder. The encoder neural network 110 produces an output based on the input image. This output is referred to as a latent representation of the input image 5. In a second step, the latent representation is quantised in a quantisation process 140 characterised by the operation Q, resulting in a quantized latent. The quantisation process transforms the continuous latent representation into a discrete quantized latent. An example of a quantization process is a rounding function.

In a third step, the quantized latent is entropy encoded in an entropy encoding process 150 to produce a bitstream 130. The entropy encoding process may be for example, range or arithmetic encoding. In a fourth step, the bitstream 130 may be transmitted across a communication network.

In a fifth step, the bitstream is entropy decoded in an entropy decoding process 160. The quantized latent is provided to another trained neural network 120 characterized by a function $g_\theta$ acting as a decoder, which decodes the quantized latent. The trained neural network 120 produces an output based on the quantized latent. The output may be the output image of the AI based compression process 100. The encoder-decoder system may be referred to as an autoencoder.

The system described above may be distributed across multiple locations and/or devices. For example, the encoder 110 may be located on a device such as a laptop computer, desktop computer, smart phone or server. The decoder 120 may be located on a separate device which may be referred to as a recipient device. The system used to encode, transmit and decode the input image 5 to obtain the output image 6 may be referred to as a compression pipeline.

Figure 2:
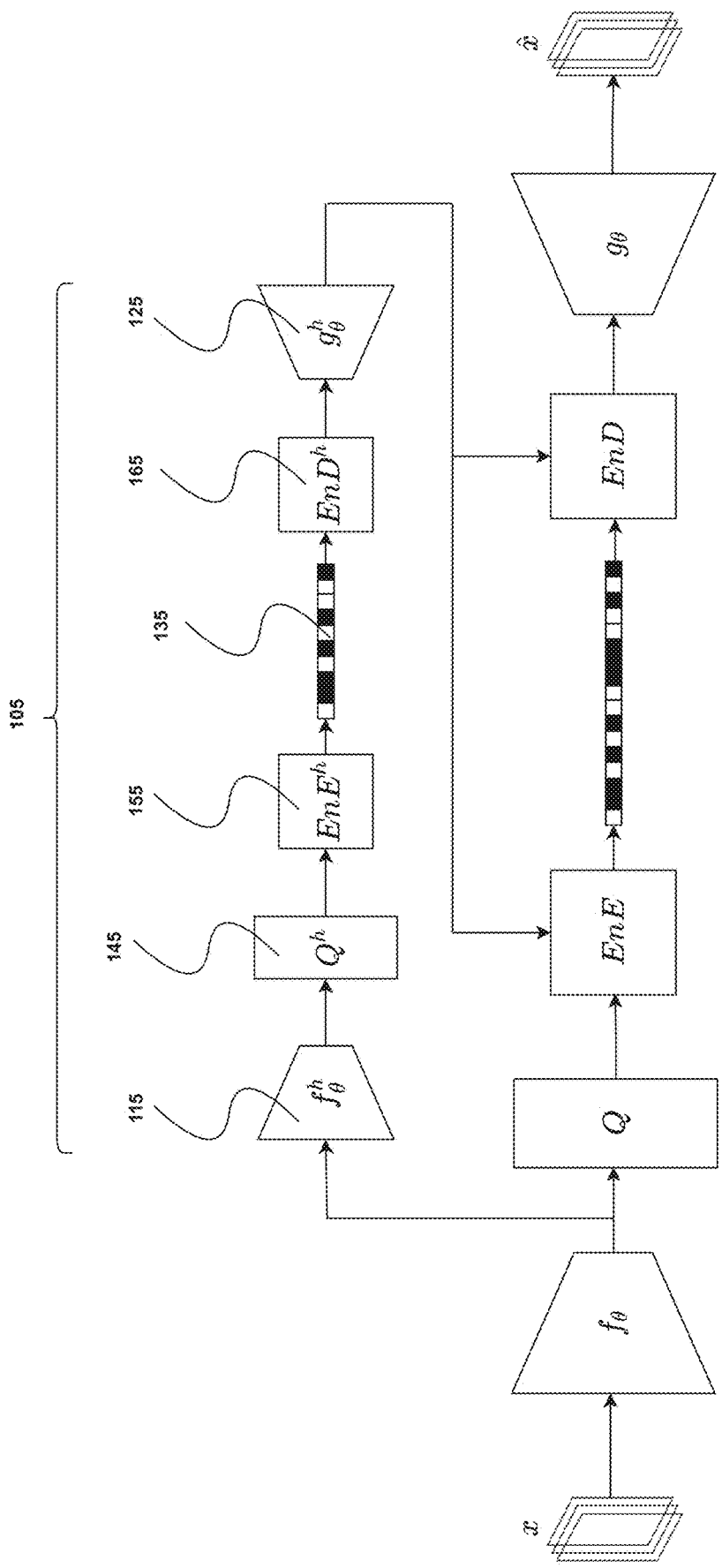
FIG. 2 illustrates a further example of an image or video compression, transmission and decompression pipeline including a hyper-network.

The AI based compression process may further comprise a hyper-network 105 for the transmission of meta-information that improves the compression process. The hyper-network 105 comprises a trained neural network 115 acting as a hyper-encoder $f_\theta^h$ and a trained neural network 125 acting as a hyper-decoder $g_\theta^h$. An example of such a system is shown in FIG. 2. Components of the system not further discussed may be assumed to be the same as discussed above. The neural network 115 acting as a hyper-decoder receives the latent that is the output of the encoder 110. The hyper-encoder 115 produces an output based on the latent representation that may be referred to as a hyper-latent representation. The hyper-latent is then quantized in a quantization process 145 characterised by $Q^h$ to produce a quantized hyper-latent. The quantization process 145 characterised by $Q^h$ may be the same as the quantisation process 140 characterised by Q discussed above.

In a similar manner as discussed above for the quantized latent, the quantized hyper-latent is then entropy encoded in an entropy encoding process 155 to produce a bitstream 135. The bitstream 135 may be entropy decoded in an entropy decoding process 165 to retrieve the quantized hyper-latent. The quantized hyper-latent is then used as an input to trained neural network 125 acting as a hyper-decoder. However, in contrast to the compression pipeline 100, the output of the hyper-decoder may not be an approximation of the input to the hyper-decoder 115. Instead, the output of the hyper-decoder is used to provide parameters for use in the entropy encoding process 150 and entropy decoding process 160 in the main compression process 100. For example, the output of the hyper-decoder 125 can include one or more of the mean, standard deviation, variance or any other parameter used to describe a probability model for the entropy encoding process 150 and entropy decoding process 160 of the latent representation. In the example shown in FIG. 2, only a single entropy decoding process 165 and hyper-decoder 125 is shown for simplicity. However, in practice, as the decompression process usually takes place on a separate device, duplicates of these processes will be present on the device used for encoding to provide the parameters to be used in the entropy encoding process 150.

Further transformations may be applied to at least one of the latent and the hyper-latent at any stage in the AI based compression process 100. For example, at least one of the latent and the hyper latent may be converted to a residual value before the entropy encoding process 150,155 is performed. The residual value may be determined by subtracting the mean value of the distribution of latents or hyper-latents from each latent or hyper latent. The residual values may also be normalised. An example of an AI based compression process comprising a hyper-network is described in Ball& Johannes, et al. "Variational image compression with a scale hyperprior." arXiv preprint arXiv:1802.01436 (2018), which is hereby incorporated by reference.

To perform training of the AI based compression process described above, a training set of input images may be used as described above. During the training process, the parameters of both the encoder 110 and the decoder 120 may be simultaneously updated in each training step. If a hyper-network 105 is also present, the parameters of both the hyper-encoder 115 and the hyper-decoder 125 may additionally be simultaneously updated in each training step.

The training process may further include a generative adversarial network (GAN). When applied to an AI based compression process, in addition to the compression pipeline described above, an additional neutral network acting as a discriminator is included in the system. The discriminator receives an input and outputs a score based on the input providing an indication of whether the discriminator considers the input to be ground truth or fake. For example, the indicator may be a score, with a high score associated with a ground truth input and a low score associated with a fake input. For training of a discriminator, a loss function is used that maximizes the difference in the output indication between an input ground truth and input fake.

When a GAN is incorporated into the training of the compression process, the output image 6 may be provided to the discriminator. The output of the discriminator may then be used in the loss function of the compression process as a measure of the distortion of the compression process. Alternatively, the discriminator may receive both the input image 5 and the output image 6 and the difference in output indication may then be used in the loss function of the compression process as a measure of the distortion of the compression process. Training of the neural network acting as a discriminator and the other neutral networks in the compression process may be performed simultaneously. During use of the trained compression pipeline for the compression and transmission of images or video, the discriminator neural network is removed from the system and the output of the compression pipeline is the output image 6.

Incorporation of a GAN into the training process may cause the decoder 120 to perform hallucination. Hallucination is the process of adding information in the output image 6 that was not present in the input image 5. In an example, hallucination may add fine detail to the output image 6 that was not present in the input image 5 or received by the decoder 120. The hallucination performed may be based on information in the quantized latent received by decoder 120.

As discussed above, a video is made up of a series of images arranged in sequential order. AI based compression process 100 described above may be applied multiple times to perform compression, transmission and decompression of a video. For example, each frame of the video may be compressed, transmitted and decompressed individually. The received frames may then be grouped to obtain the original video.

The frames in a video may be labelled based on the information from other frames that is used to decode the frame in a video compression, transmission and decompression process. Frames which are decoded using no information from other frames may be referred to as I-frames. Frames which are decoded using information from past frames may be referred to as P-frames. Frames which are decoded using information from past frames and future frames may be referred to as B-frames. Frames may not be encoded and/or decoded in the order that they appear in the video. For example, a frame at a later time step in the video may be decoded before a frame at an earlier time.

The images represented by each frame of a video may be related. For example, a number of frames in a video may show the same scene. In this case, a number of different parts of the scene may be shown in more than one of the frames. For example, objects or people in a scene may be shown in more than one of the frames. The background of the scene may also be shown in more than one of the frames. If an object or the perspective is in motion in the video, the position of the object or background in one frame may change relative to the position of the object or background in another frame. The transformation of a part of the image from a first position in a first frame to a second position in a second frame may be referred to as flow, warping or motion compensation. The flow may be represented by a vector. One or more flows that represent the transformation of at least part of one frame to another frame may be referred to as a flow map.

A number of concepts related to the AI compression processes discussed above will now be described. Although each concept is described separately, one or more of the concepts described below may be applied in an AI based compression process as described above.

The process of video compression, transmission and decompression will now be discussed in further detail. In image compression, information redundancy may be reduced by exploiting the spatial correlation that exists between pixels. For video, this concept may be extended to a temporal domain, An example of this is the extraction of information from across frames.

Between adjacent frames of a video scene, some objects move whilst others stay still. This can be referred to as motion of the object. The part which is concerned with inferring this motion, given two adjacent frames $x_1$ and $x_2$, may be called motion estimation. With an estimate of the motion $f^{[2,1]}$, $x_1$ may be warped to align better with $x_2$ in a step called motion compensation. The motion estimation or warping may be defined by motion vectors.

Motion estimation and motion compensation may be referred to by the acronym ME-MC. The motion can be represented in multiple ways, ME-MC can be performed at pixel-wise level. An example is this is the various forms of optical flow. ME-MC may also be performed on a block-wise level, including block-based and/or multi-scale motion vector estimation. Each block may comprise a plurality of pixels.

An alternative method of representing motion that may be applied in a compression process is through the use of temporal context. The temporal context may be defined by a temporal context variable that is used during the compression process. In particular, the temporal context may be obtained using a matrix or kernel that is applied to previous frames.

In image compression, probability models such as hyper-priors or implicit, locally autoregressive context models (such as context matrices, which may be referred to as L-matrices or L-context, or Pixel CNN networks) as described for example in PCT/GB2021/052770, which is hereby incorporated by reference, can be used to model the relationship between pixels in the spatial domain. L-matrices may be considered an example of a spatial context variable. In theory, an ideal model would be a globally autoregressive one; one which can parametrise the distribution of the current pixel $x_i$ conditioned on all previously decoded pixels $x_{<i}$.

However, conditioning on a smaller area of pixels may be performed in an context matrix model. This can be sufficient for natural images, since the immediate spatial neighbourhood for the current pixel often has large mutual information.

Context matrix models may be an adaptive kernel-based context modelling method, more specifically a spatial one, where the kernel $L_i$ is predicted for each element. For example, a 3×3 context window requires 4 parameters per element to construct the full (masked) kernel.

The collection of all kernels for all pixels form the L-matrix L, a sparse, banded, strictly lower triangular matrix, which can be encoded and transmitted as metainformation with the rest of the bitstream.

Between adjacent frames in a video sequence, most of the image looks the same, save for occasional motion of some object(s). Hence, it can be assumed that a plethora of information about the current pixel exists in the preceding frame. This means we can extend the context matrix concept to a 3D setting and introduce a kernel-based, spatio-temporal context modelling method, which essentially is kernel-based motion compensation.

Figure 3:
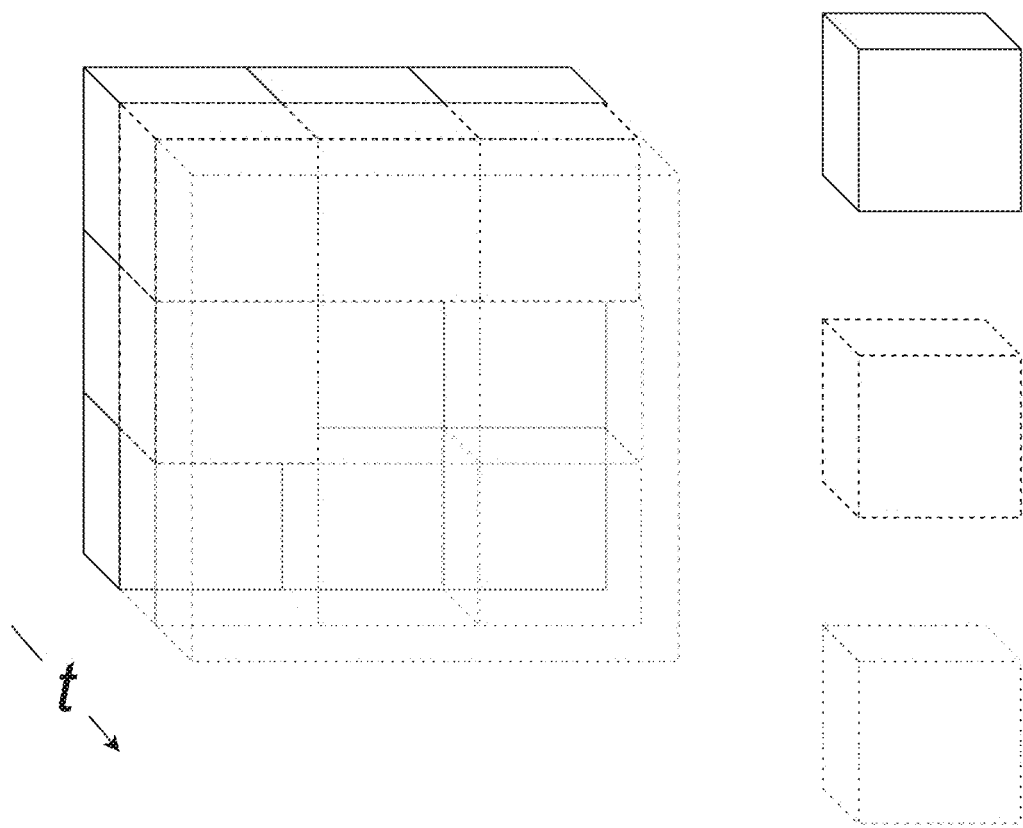
FIG. 3 illustrates a visualisation of a 3×3×3 spatio-temporal context kernel, consisting of 4 L-context parameters (light) and 9 P-context parameters (dark), with all other pixels masked out for causality.

Following from L-context methods, an adaptive spatio-temporal kernel for each pixel which is masked in the future, both in space and time can be defined. This kernel is an example of a temporal context variable and a spatial context variable. This arrangement is shown in FIG. 3. For example, assuming a 3×3×3 kernel, there are 13 context parameters per element in total. This includes the previously seen 4 parameters for the current frame that comprise the L-context parameters $L_i$ (light blue pixels), and 9 additional parameters that search in the full spatially local neighbourhood of the previous frame (purple pixels). All other pixels masked out for causality. We can denote these set of parameters with $P_i$, and together for all pixels in a frame these comprise the a P-matrix. The application of a P-matrix on previously encoded frames can be referred to as P-context.

An advantage of using a P-matrix is that the kernels define their own interpolation. This makes it more flexible to weigh contributions of multiple pixels in the past frame, even allowing to zero out the kernel completely if this approach is optimal.

The P-context parameters can be predicted using a hyper-prior, such as a hyper-network as discussed above, where the parameters are the output of the hyper-network. For every element, k×k×r parameters are required, where k×k is the spatial kernel size and r is the number of past frames included in the temporal search domain.

Mathematically, this can be formulated as $$\bar{x}_i^{[t]} = \sum_{s=1}^{r}\sum_{j=1}^{k^2} P_{i,j}^{t,t-s}\hat{x}_j^{[t-s]}, j \in \text{spatial neighborhood of } x_i$$

where $\bar{x}_i^{[t]}$ is the motion compensated pixel for the current frame (time index [t]) and spatial position i, and $\hat{x}_j^{[t-s]}$ is the decoded pixel for the previous s frames (time index [t-s]) at spatial position j, where j is in the set of pixels neighbouring spatial position i. For the rest of the blog, unless otherwise stated, we will assume r=1 and use a short-hand matrix multiplication formulation to denote the above operation per pixel:

$$\bar{x}_i^{[t]} = P_i \hat{x}_i^{[t-1]}$$

P-context or any kernel-based solution can be applied in image space as there is temporal redundancy between frames. However, motion between frames can span distances of several pixels, especially at larger resolution. If the block is smaller, true motion may not be capture. Moreover, producing large kernels requires large numbers of parameters per element to be predicted Additionally, applying large kernels also induces a heavy FLOP count, putting more strain on the computational load for these models.

It may be beneficial if the P-context kernel is as large as the general motion between frames are. So if objects commonly move distances of 10-20 pixels between frames, the P-matrix may be at least as big. In image space, this corresponds to very large kernels in order to handle large motion.

The P-matrix may be applied in latent space. This means that the P-matrix is applied to the latent representations of images or frames as discussed above. If the P-matrix is instead applied in latent space, a commensurate downsampling factor from the image scale would apply on the kernel size of the P-matrix. This may are larger motions to be captured with smaller kernel sizes.

In addition to this, there are further methods that may be used to parameterize the kernels. The following approaches may be used:

Optical flow in conjunction with kernel-based methods: Optical flow has no limitations in receptive field. Optical flow warping can be applied on the previous frame to obtain a flow-compensated frame, $\bar{x}_{flow}^{[t]} = \text{warp}(\hat{x}^{[t-1]}, f^{[t,t-1]})$, followed by a P-matrix application to obtain the final motion-compensated frame: $\hat{x}^{[t]} = P\bar{x}_{flow}^{[t]}$.

Compose large low-rank kernels by predicting separable kernels: For a k×k-sized kernel, instead of predicting k 2 parameters for a full-rank P-matrix, we can learn smaller, separable kernels with far fewer parameters to construct a low-rank kernels of the desired size. A k×k-sized low-rank kernel can be constructed by: Two spatially separable kernels of sizes k×1 and 1×k, requiring 2k parameters, which are applied in serial on the previous frame; or two smaller kernels of sizes p×p and q×q where p+q−1=k; for example, a 9×9 kernel can be composed by convolving two 5×5 kernels with each other, requiring 2×5 2=50 parameters instead of 8181.

Pre-process input with a neural network: A pre-processing network can be applied on the past frame, such as a UNet or any feed-forward network, which transforms or extracts the information in a way such that motion compensation can be facilitated. An example of a UNet architecture is provided in Ronneberger, Olaf et al. "U-Net: Convolutional Networks for Biomedical Image Segmentation." ArXiv abs/1505.04597 (2015): n. pag, which is hereby incorporated by reference. Two P-matrices can be predicted, one which is applied on the original input $x^{[t-1]}$ and the other on the pre-processed input $NN(x^{[t-1]})$. The pre-processing network may act as an edge detector.

Multi-scale motion compensation: The image may be downsampled to smaller resolutions and apply the motion compensation there. For example, a 5×5 kernel in 4× downsampled resolution is equivalent to a 20×20 kernel in the original resolution. Such an approach can be performed multiple times.

Kriging: Approaches involving kriging can also be used.

If P-context is applied in latent space, an implicit equation which incorporates a P-matrix can be used.

Consider the implicit equation that underpins L-context:

$$\hat{y}^{[t]} = \lfloor y^{[t]} - \mu^{[t]} - L^{[t]}\hat{y}^{[t]} \rceil + \mu^{[t]} + L^{[t]}\hat{y}^{[t]}$$

We can incorporate P-context by taking $$\mu^{[t]} = \mu_{HP}^{[t]} + P^{t,t-1}\hat{y}^{[t-1]}$$

where $\mu_{HP}^{[t]}$ is the location parameter directly outputted from the hyperprior.

Temporal modelling, such as the use of P-context, may be applied in latent space. The latent space may have significantly reduced dimensionality compared to the input image resolution, which may make model runtime faster. This may also speed up the meta-information AutoEncoder.

If the primary temporal modelling happens on latent space, we may pre-process a latent dataset and use the pre-processed dataset for training. There is no need to "generate" a latent while training if all new operations only operate on the latent.

If pre-processed latents are used, we can load them in all at once and also transform, encode and deduce them all at once. This breaks the autoregressive chain, thus no longer requiring serial algorithm execution.

Solving the secondary temporal autoregressive chain requires simultaneously modelling dependencies between the temporal meta-information. Suppose all the temporal meta-information is available, for example flow maps, at the same time. An "image compression pipeline", a compression autoencoder may be used to compress all flow maps simultaneously. We want:

$$AE(\text{flow}_{(0,1)}, \ldots, \text{flow}_{(D-1,D)}) \to \text{bitstream} \to \hat{\text{flow}}_{(0,1)}, \ldots, \hat{\text{flow}}_{(D-1,D)}$$

Note that to have all temporal meta-information simultaneously, the temporal meta-information is not allowed to interact with each other; e.g. $\text{flow}_{(0,1)}$ can not influence $\text{flow}_{(1,2)}$.

Such an encoding pass may be performed as follows:
1. Run the frame-AE runs, which may be an image compression pipeline as described above: $y_0 = \text{Enc}(x_0) \to \mu_0$, $\sigma_0 = HN(y_0) \to \hat{y}_0 = \text{round}(y_0 - \mu) + \mu \to \hat{x}_0 = \text{Dec}(\hat{y}_0)$.
2. Run the frame-AE D times and get D times the tuple of $(\hat{y}_i, \mu_i, \sigma_i)$
3. Run a temporal AE on $(\hat{\xi}_0, \ldots, \hat{\xi}_D, \mu_0, \ldots, \mu_D, \sigma_0, \ldots, \sigma_D)$ to predict refined entropy parameters $(\tilde{\mu}_0, \ldots, \tilde{\mu}_D, \tilde{\sigma}_0, \ldots, \tilde{\sigma}_D)$
4. Use the new entropy parameter for encoding the bitstream.

The decoding pass may be performed as follows:
1. Execute the frame-HDec D times to get $(\mu_0, \ldots, \mu_D, \sigma_0, \ldots, \sigma_D)$.
2. Execute the temporal AE to get $(\tilde{\mu}_0, \ldots, \tilde{\mu}_D, \tilde{\sigma}_0, \ldots, \tilde{\sigma}_D)$.
3. Use the data from 2. to get $(\hat{\xi}_0, \ldots, \hat{\xi}_D)$.
4. Use $(\hat{y}_0, \ldots, \hat{y}_D)$.
5. Execute the frame-Decoder D times to get $(\hat{x}_0, \ldots, \hat{x}_D)$.

When temporal modeling is only performed on the latent variables, the only part of our AI-based video compression that is truly temporal will be the latent entropy model. The rest of the pipeline may operate on a frame-by-frame basis, treating frames as images.

For example, just as in an AI-based image compression pipeline, input video frames may be transformed into latents, with an image Encoder neural network. Correspondingly, at decode time quantized latents will be transformed back into reconstructed frames (images) using an image Decoder neural network.

However though the transformation of the frames may be done on an image-by-image basis, the quantized latents may be modeled using a temporal entropy model. This entropy model may be designed specifically to exploit temporal correlations between the video frame latents.

Figure 4:
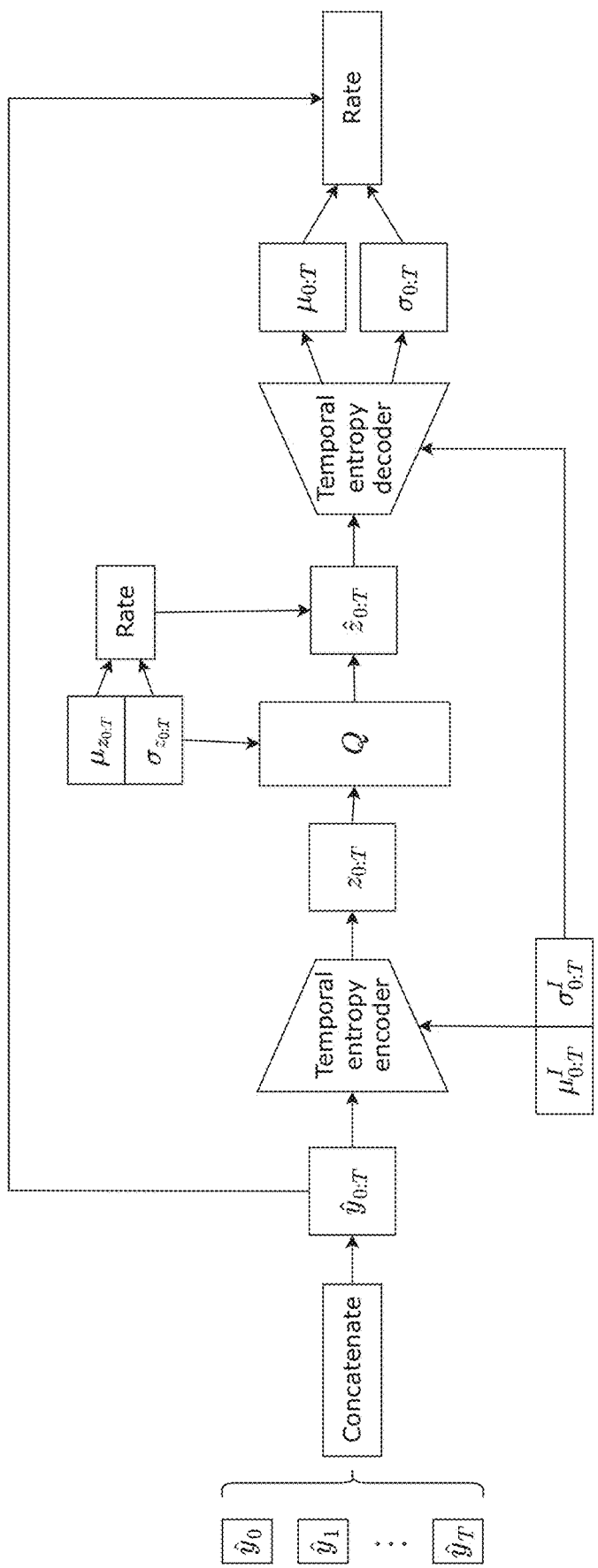
FIG. 4 illustrates an example of temporal entropy modelling with a temporal autoencoder.

This approach is not necessarily autoregressive. The amount of auto-regression included in our model may be controlled. For example, if no auto-regression is included, an entire stack of quantized video latents can be encoded/decoded at once. Frames are not encoded/decoded serially; they can all be processed in parallel. An example of an autoregressive-free model is shown in FIG. 4, comprising of 3D convolutions. The autoencoder takes in video latents (frames concatenated along a time dimension). Temporal hyper-latents are quantized and stored in the bitstream. These are then fed through a temporal entropy decoder to produce entropy parameters. The entire stack of quantized video latents are sent to the bitstream via a fully factorized entropy model using the produced entropy parameters.

Figure 5:
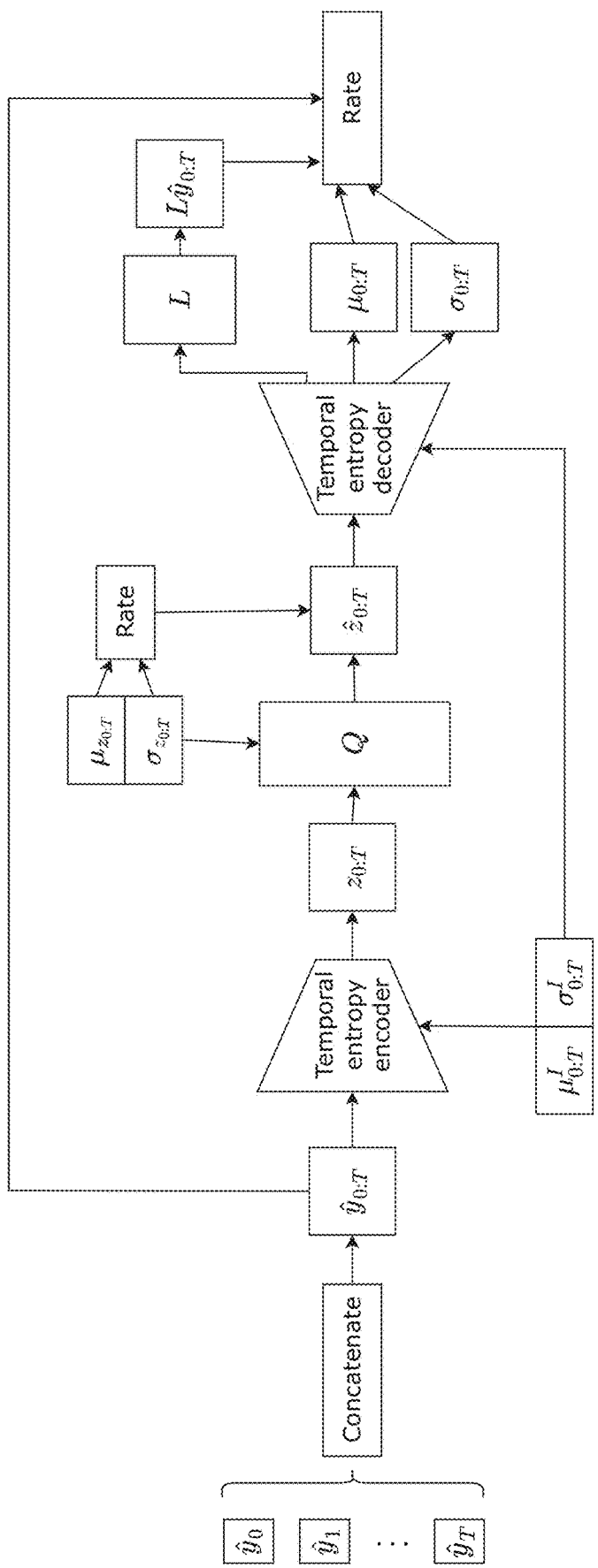
FIG. 5 illustrates an example of temporal entropy modelling with a temporal autoencoder and an additional context module.

Alternatively, autoregressive components may be included in the entropy model. For example the model depicted in FIG. 5 includes an autoregressive context component over context-windows. The temporal entropy decoder produces an additional coefficient matrix L, which is used to update location parameters using past context (available quantized latents from the previous frame, or prior pixels in raster-scan order).

In training, latents may be pre-computed only once (using a pretrained image Encoder) on a training dataset, then stored. Then, training of the actual temporal entropy model may be performed on this pre-computed dataset.

Latent dataset creation will now be discussed in more detail. For the purposes of transforming frames, each frame may be treated as if it was an image. Therefore, a dataset of pre-computed latents can be created using a pre-trained image compression model. For a given video, each frame $x_t$, $t=0, \ldots, T$ of the video is transformed through a pre-trained image Encoder neural network into a corresponding latent $y_t$. The latents may then be concatenated together along a time dimension.

Figure 6:
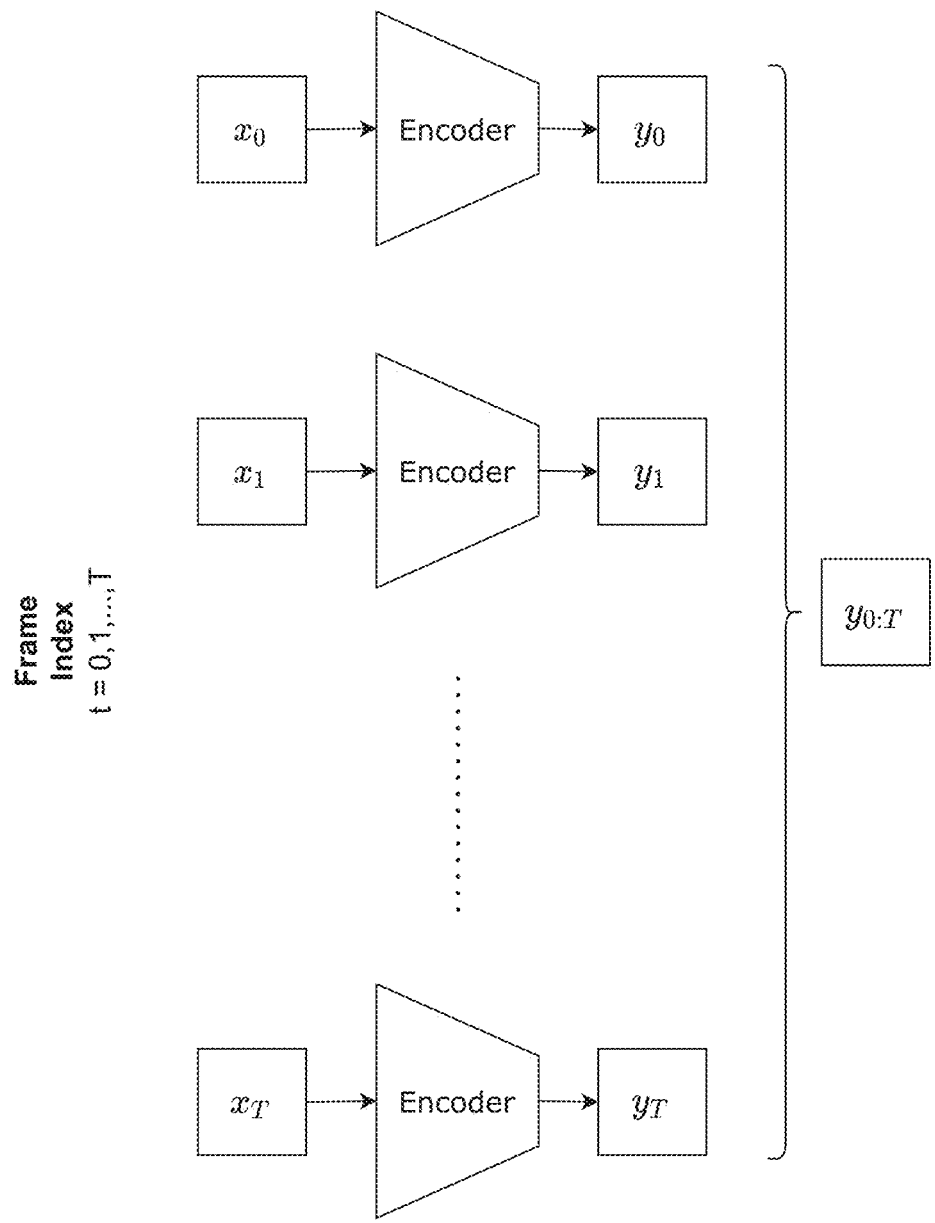
FIG. 6 illustrates an example of a latent dataset generation.

This entire process may only be done once. The latent values can be retrieved later to train a temporal entropy model, separately from image encoders and decoders. An example process of creating a latent dataset is illustrated in FIG. 6.

Figure 7:
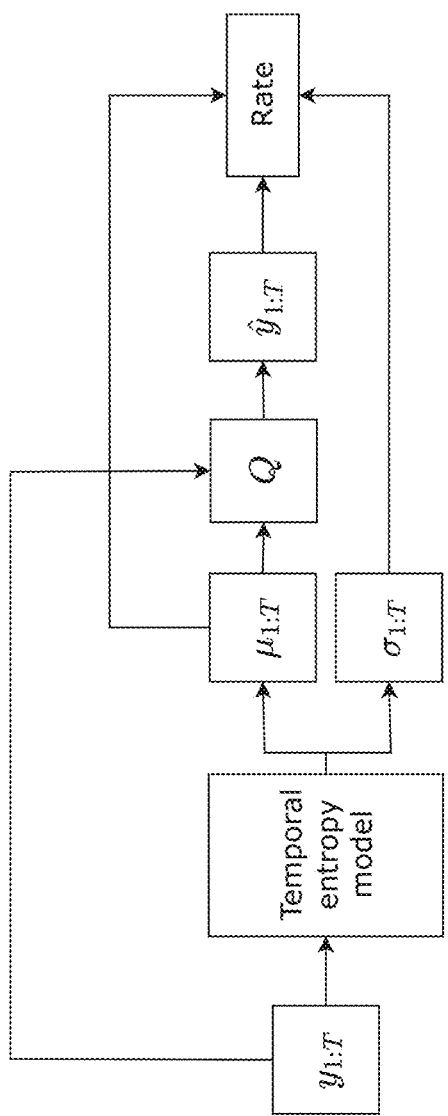
FIG. 7 illustrates an example of the training of a generic temporal entropy model.

Having created a training dataset, quantized video latents may be modeled by exploiting temporal structure in a frame stack of quantized latents. As a first example a mode without any autoregressive components will be considered. At a high level, a generic temporal entropy model models each quantized latent pixel using a fully factorized entropy model. For example, the temporal entropy model could output location $\mu_t$ and scale $\sigma_t$ parameters for each frame, so that the rate of a latent pixel is computed as $$\text{rate}(\hat{y}_t) = -\log_2(p(\hat{y}_t|\mu_t, \sigma_t))$$

for each pixel in the frame latent. An illustration of this generic model is shown in FIG. 7. Quantized latents for each frame in a video sequence are concatenated together, and fed as input to a temporal entropy model. The temporal entropy model may be a convolutional neural network with 3D convolutions (two spatial dimensions and a time dimension). The temporal entropy model outputs parameters for a fully factorized entropy model, from which the rate is computed.

The temporal entropy model may take in all latents for a group of pictures (GOP). That is, all latents in a video sequence will be concatenated together along a time dimension, which may be denoted $\hat{y}_{0:T}$, and fed as input to the temporal entropy model. The temporal entropy model could be for instance a convolutional neural network with 3D convolutions (two spatial dimensions and a time dimension).

The temporal entropy model may be trained by minimizing rate. The rate may be the only training objective. There is no requirement also minimize distortion as the latents have been pre-computed using a pretrained image compression pipeline.

At validation/test time, latents are quantized according to the temporal scale predictions $$\hat{y}_{1:T} = \text{round}(y_{1:T} - \mu_{1:T}) + \mu_{1:T}$$

Several possible architectures for the temporal entropy model will now be discussed.

A first possibility is to model the quantized latents using a PixelCNN-like architecture. Each pixel in the stack of quantized latents $\hat{y}_{1:T}$ could be modeled using a masked 3D convolutional neural network. If pixels are decoded in a frame-by-frame, raster-scan ordering, then masking can be used to obscure pixels not yet available at decode time. That is, each 3D convolutional filter (say of size 3×3×3) would be "masked" so that only kernel weights multiplying past pixel values are used.

A second possibility is Auto-encoder architectures. In it's simplest form, an autoencoder based architecture will take in the concatenated stack of latents $y_{1:T}$, and transform these to a stack of temporal hyperlatents, $z_{1:T}$. These temporal hyper-latents will be quantized using an entropy model (for example using learned per-channel parameters). The quantized temporal hyper-latents are then input to a temporal entropy decoder, which outputs parameters of a fully factorized entropy model. Location parameters may be used to quantize $y_{1:T}$, while all parameters are used to compute the rate of $\hat{y}_{1:T}$, and to encode/decode the quantized latents into/from the bitstream.

A third possibility is using spatial-temporal context. In addition to outputting location and scale parameters, the temporal entropy model can also employ spatial-temporal context via a learned or predicted coefficient matrix L. This coefficient matrix may be lower-triangular, in that all non-zero entries correspond to available prior pixels in the decode order. For example, each row of L could operate on K×K×K blocks of the quantized latent, but would only have non-zero entries from past frames, as well as current-frame pixels falling before the current pixel (in raster-scan order).

A matrix-vector product between L and '$\hat{y}_{1:T}$' is computed, $L\hat{y}_{1:T}$, which is used to both quantize the current pixel, and refine the location prediction of the current pixel. The rate computation would then be:

$$\text{rate}(\hat{y}_{1:T}) = -\log_2(p(\hat{y}_{1:T}|\mu_{1:T} + L\hat{y}_{1:T}, \sigma_{1:T})) \qquad (1)$$

while quantization is done via $$\hat{y}_{1:T} = \text{round}(y_{1:T} - \mu_{1:T} - L\hat{y}_{1:T}) + \mu_T) + L\hat{y}_{1:T} \qquad (2)$$

as shown in FIG. 4.

In the preceding discussion, the context coefficients L contains both spatial and temporal context coefficients. The spatial and temporal coefficients may be broken apart and represented by two different matrices, for example L for spatial, and P for temporal context. Using this notation, rate and quantization would be written as (for frame 't')

$$\text{rate}(\hat{y}_t) = -\log_2(p(\hat{y}_t|\mu_t + L\hat{y}_t + P\hat{y}_{1:t-1}, \sigma_t))$$

while quantization is done via $$\hat{y}_t = \text{round}(y_t - \mu_t - L\hat{y}_t - P\hat{y}_{1:t-1}) + \mu_t + L\hat{y}_t + P\hat{y}_{1:t-1}$$

In this notation, the temporal coefficients P only operate on prior quantized frames. Both the L and P notation and the L-only notation are correct.

The entropy model described by rate equation (1) and quantization (2) is autoregressive. Quantization and rate of the current pixel depends on prior pixels (in raster scan order), and past pixels from prior frames.

The temporal entropy model can be modified by transforming $\hat{y}_{1:t}$, which may also improve quantization residuals. For example, we may transform available temporal context via a lifting $\phi(\hat{y}_{1:t})$, so that quantization and rate become respectively $$\hat{y}_t = \text{round}(y_t - \mu_t - L_t\phi(\hat{y}_{1:t})) + \mu_t + L_t\phi(\hat{y}_{1:t})$$

and its rate is given by $$\text{rate}(\hat{y}_t) = -\log_2(p(\hat{y}_t | \mu_t + L_t\phi(\hat{y}_{1:t}), \sigma_t))$$

Here $\phi$ can variously be thought of as an in-loop filter, a post-processing module, or a non-linear feature extractor. For example:

$\phi$ could calculate multiscale features from the previously available quantized latents (an image pyramid). For example, let $\Pi_{\downarrow s}$ be a projection operator which downsamples s times in the height and width dimensions. Then $\phi(\hat{y}_{t-1}) = (\Pi_{\downarrow 1}\hat{y}_{t-1}, \Pi_{\downarrow 2}\hat{y}_{t-1}, \ldots, \Pi_{\downarrow N}\hat{y}_{t-1})$ can be defined. The context coefficient matrix L would then use multiple scales to regress a prediction of location parameter for $\hat{y}_t$.

$\phi$ could be a Neural Network, trained to extract useful information from prior frames $\phi$ could extract features by projecting $\hat{y}_t$ onto a (possibly infinite dimensional) basis, such as spines, radial basis functions, or wavelets.

$\phi$ could warp prior frames according to a flow, in which case $L\phi(\hat{y}_{1:t})$ is a form of motion compensation.

$\hat{y}$ could perform in-loop filtering, to eg reduce quantization artifacts.

Figure 8:
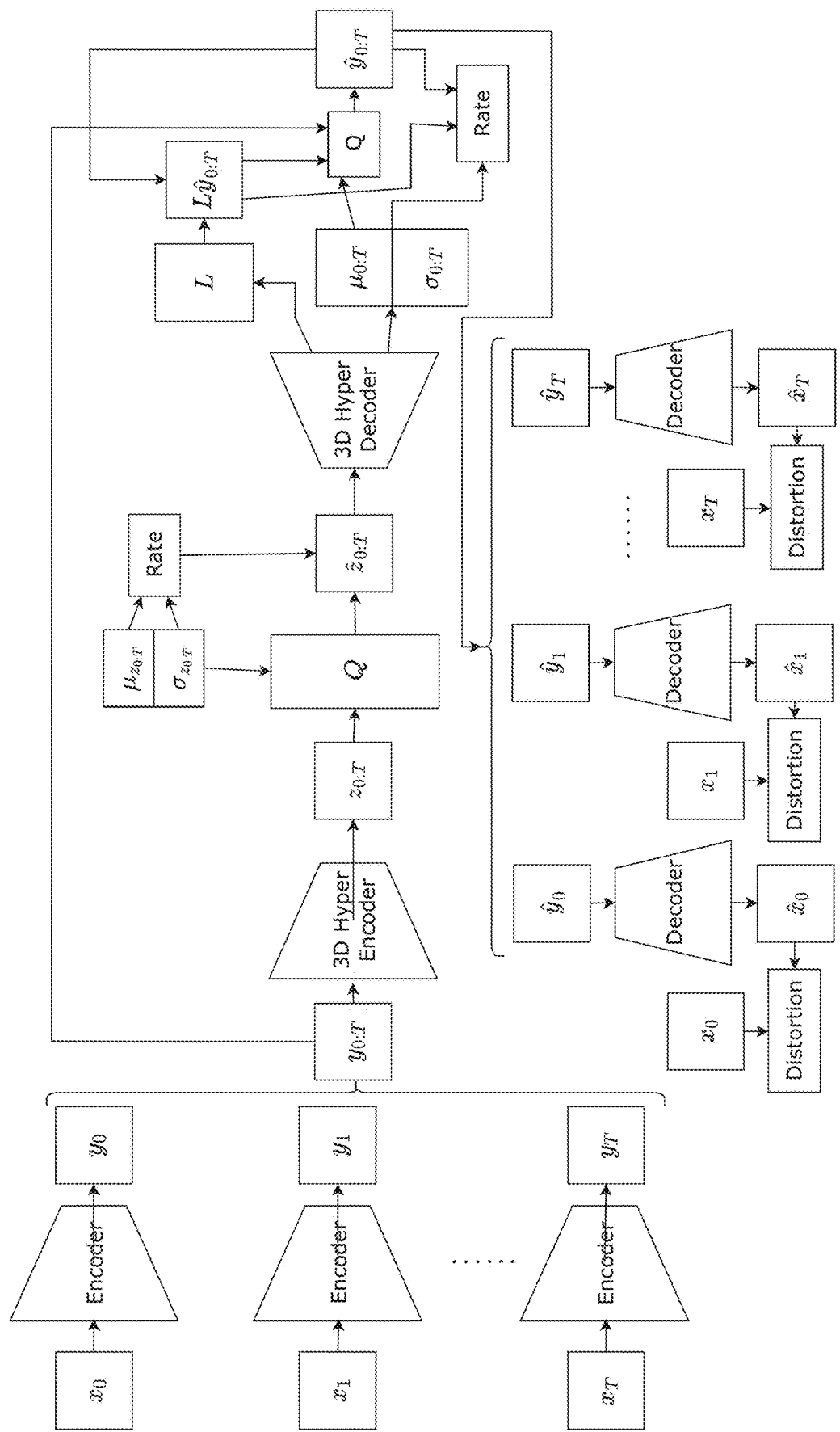
FIG. 8 illustrates an example of end-to-end training of a temporal entropy model.

The previous sections have described training (and deploying) a temporal entropy model on frame latents, where the quantized frame latents are given by a pretrained image pipeline. However, this model may also be trained in an end-to-end fashion, with a distortion loss. If such a temporal entropy model were to be included in end-to-end training, it would be slotted in to perform rate calculations on the quantized latents. The quantized latents would be split along the time dimension, and each would be fed into an image decoder. A distortion loss would be computed and backpropagated in addition to the rate, so that gradient information would flow backwards through the entire pipeline. An example of such a pipeline is shown in FIG. 8. Frames are transformed into latents using an image Encoder network, on a frame-by-frame basis. Latents are concatenated along a time dimension, and are then fed into a 3D convolutional hyper-encoder, to produce hyper-latents $z_{0:T}$, which are quantized and then inputted into a 3D convolutional hyper-decoder. This temporal entropy model outputs entropy parameters that are used for both quantization and rate computations. The quantized latent is then split along the time dimension, and then fed frame-by-frame into image Decoder networks, outputting reconstructed frames.

The example architecture in FIG. 8 assumes frame are processed via a per-frame (image-based) Encoder, and similarly reconstructions are given by a per-frame Decoder (both Encoder and Decoder use 2D convolutional neural networks). Alternatively, frames may be concatenated together along a temporal dimension (creating a GOP), and processing this entire GOP with a 3D convolutional neural network in both the Encoder and the Decoder. GOPs may be transformed to latents (and back) using temporal Encoder/Decoders.

There will now be discussed a novel way to get an approximate equivariant pipeline for arbitrary group transformations. The solution is based on reformulating a pipeline to split the rate and distortion networks and can be interpreted as a well-motivated "quantization residual reduction" loss.

3D Visual Losses will also be discussed, meaning having 3D networks for the Generator and the Discriminator; without impact Decoder runtime (decoding inference speed neutral).

For video compression, it is desirable to have an equivariant pipeline to guarantee temporal stability. In short, an equivariant pipeline has the property:

$$\text{Dec}(Q(\text{Enc}(f[x]°x))) = f[x]°\text{Dec}(Q(\text{Enc}(x)))$$

In video, the optimal operator $f$ comprises all motion that could occur between two adjacent frames and may be challenging to define analytically. The optimal operator $f$ may be referred to as "true motion". If the above-stated equation holds, video compression artefacts will stay consistent across motion transformations, and we will get temporal consistency:

$$\hat{x} = \text{Dec}(Q(\text{Enc}(x)))$$

$$f[x]°\hat{x} = f[x]°\text{Dec}(Q(\text{Enc}(x))) = \text{Dec}(Q(\text{Enc}(f[x]°x)))$$

If we have two equivariant functions, their function composition is also equivariant. Suppose we have no quantisation: given an equivariant Encoder and Decoder, the pipeline is equivariant:

$$\text{Dec}(\text{Enc}(T[x]°x)) = \text{Dec}(T[y]°\text{Enc}(x)) = T[x]°\text{Dec}(\text{Enc}(x))$$

If we introduce quantisation (a new function component in the composition), the pipeline would remain equivariant if quantisation is equivariant:

$$\text{Dec}(Q(\text{Enc}(T[x]°x))) = \text{Dec}(Q(T[y]°\text{Enc}(x))) = \text{Dec}(T[y]°Q(\text{Enc}(x))) = T[x]°\text{Dec}(Q(\text{Enc}(x)))$$

However, quantisation is only equivariant with regard to a permutation. For most (nearly all) other operators, quantisation is not equivariant:

$$Q(T[y]\cdot\text{Enc}(x)) \neq T[y]\cdot Q(\text{Enc}(x))$$

If there are quantisation errors and still assume the Encoder and Decoder are equivariant, we can write the problem as follows:

1. The transformation starts inside:

$$\text{Dec}(Q(\text{Enc}(T[x]°x))) = \text{Dec}(Q(T[y]°\text{Enc}(x))) = \text{Dec}(T[y]°\text{Enc}(x) + \text{eps}_A) = \text{Dec}(\text{Enc}(T[x]°x) + \text{eps}_A)$$

2. The transformation starts outside:

$$T[x]°\text{Dec}(Q(\text{Enc}(x))) = \text{Dec}(T[y]°Q(\text{Enc}(x))) = \text{Dec}(T[y]°\text{Enc}(x) + \text{eps}_B) = \text{Dec}(\text{Enc}(T[x]°x) + \text{eps}_B)$$

In the equations above, there are no guarantees that $\text{eps}_A$ will equal $\text{eps}_B$. In fact, in nearly all networks, this is not the case. Thus, both sides are not equivalent anymore and the network is thus not equivariant.

There are a number of possibilities to get around the quantisation problem:

A first approach is to train a pipeline without quantisation. In formulas: $\text{eps}_A = \text{eps}_B = 0$.

A second approach is to align quantisation residuals under input transformations, thus skipping the quantisation problem from an equivariance perspective. In formulas: $\text{eps}_A$ is made to be the same as $\text{eps}_B$ in overlapping regions.

A third approach is to make the Decoder more robust against quantisation residuals, thus mitigating the impact of non-aligned residuals under temporal movement. In formulas $eps_A$ and $eps_B$ may be viewed as noise and the Decoder may be made to ignore perturbation $eps_A/eps_B$.

A fourth approach is to minimise the quantisation residuals through an extra-loss forcing the latent values to align with our quantisation grid and become as close as possible to being integers. In formulas: Keeping $eps_A \neq eps_B$ but making both $eps_A$ and $eps_B$ tiny so that the tiny perturbations no longer matter. The fourth approach will be discussed in further detail below.

Suppose we have a lossless compression pipeline. We have two frames $x_1$ and $x_2$, and know the motion between the two frames: $x_2 = \text{warp}(x_1, (f_x, f_y)) = f^\circ x_1$.

By definition, lossless compression has no temporal artefacts. If we have:

$$x_1 = \text{pipeline}(x_1) \text{ and } x_2 = \text{pipeline}(x_2)$$

we can write:

$$x_2 = \text{pipeline}(f^\circ x_1) = f^\circ \text{pipeline}(x_1) = f^\circ x_1 = x_2$$

Figure 9:
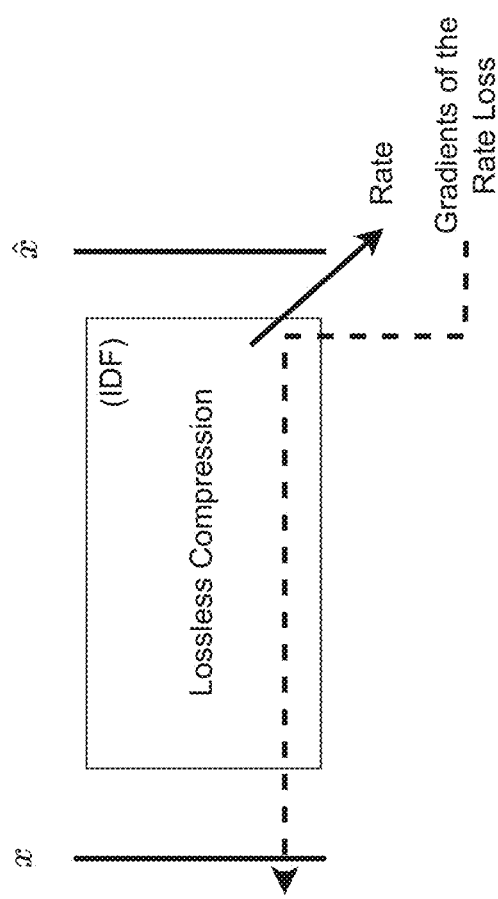
FIG. 9 illustrates a lossless AI-based compression pipeline.

In short: Lossless compression is perfectly equivariant. A lossless AI-based Compression pipeline, which could be Integer-Discrete-Flow, is shown in FIG. 9.

Figure 10:
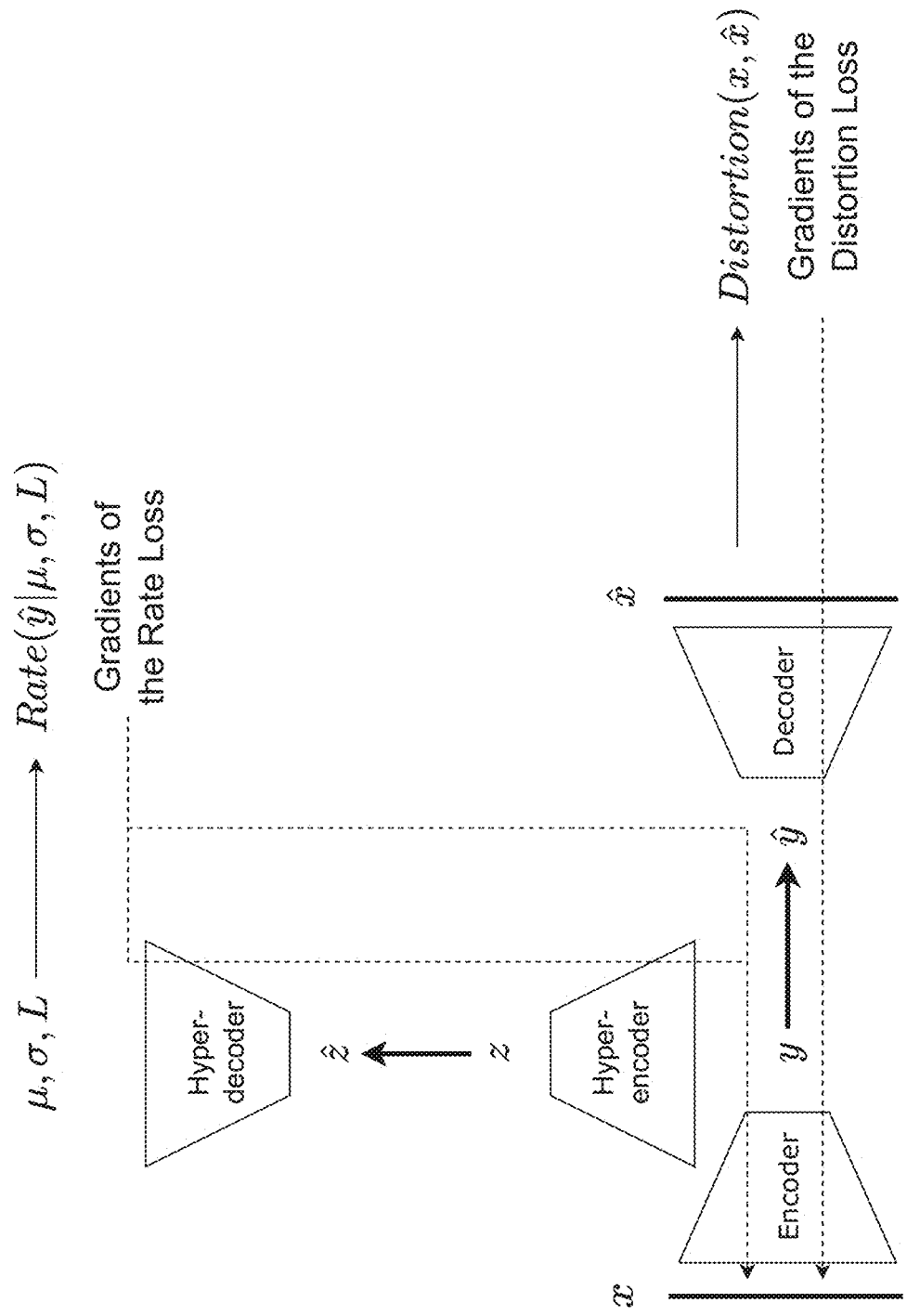
FIG. 10 illustrates an AI-based compression pipeline.

Rate and Distortion may be trained simultaneously with an end-to-end training objective as shown in FIG. 10. The Decoder gets gradients from the distortion losses, and the Encoder gets gradients from the distortion and rate.

Figure 11:
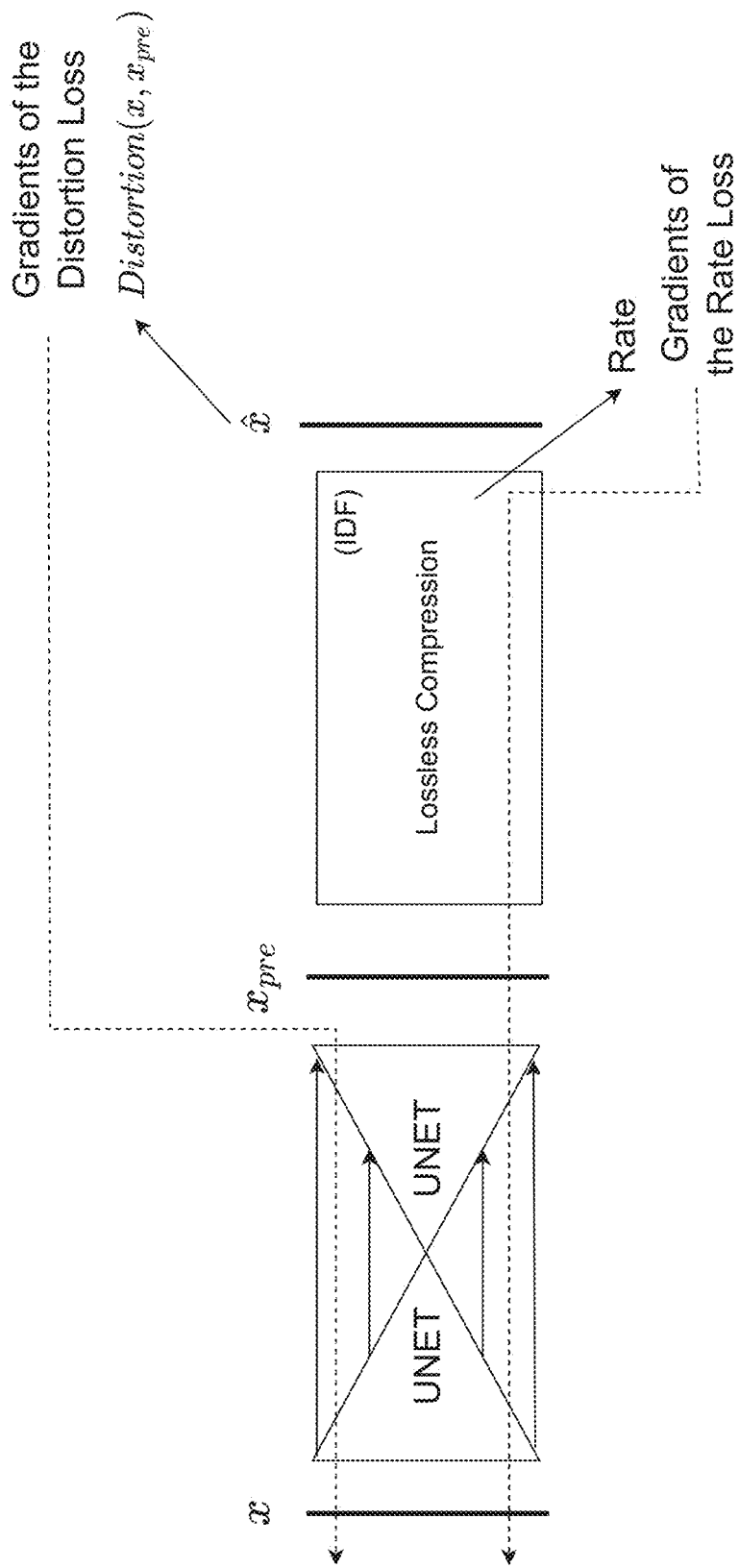
FIG. 11 illustrates a lossy AI-based compression pipeline comprising a pre-processing module and a lossless compression module.

As an alternative a state-of-the-art lossless compression pipeline can be transformed from lossless to lossy. Instead of changing the lossless part of the pipeline, a pre-processing module may be added that transforms x into x̂, introducing distortion, and then compressing x̂ with the lossless pipeline. This combination would result in lossy compression. An example of A lossy AI-based compression pipeline comprising a pre-processing module and a lossless compression module is shown in FIG. 11. $X_{pre}$ is an example of an intermediate image in the AI compression pipeline. An intermediate image may be an image corresponding to the input image or to the output image, but may be an approximation of either of these images.

FIG. 11 shows the gradient flow of such a lossy pipeline (comprising a lossless module). Note that the pre-processing module handling the distortion gets gradients from the distortion losses and the rate loss originating from the lossless pipeline. Hence, while the pipeline is split into separate modules, one handling distortion (pre-processing module) and one handling rate (lossless component), the entire pipeline may be end-to-end due to distortion and rate gradients mixing.

The pre-processing module that determines X may be a continuous neural network without quantisation (e.g. a UNet). Hence, we can train the pre-processing module to become equivariant. Furthermore, because the only distortion source in the pipeline comes from this module, this results in an equivariant lossy compression pipeline. Visual loss is decoupled from quantisation.

The pre-processing module may be selected from a plurality of modules, for example a plurality of neural networks. The module used in the compression process may be selected based on a predetermined requirement. For example, the module used may be selected based on a quality requirement based on the level of acceptable distortion between the input image and the output image. The module used may be selected based on a runtime requirement. The plurality of neural networks available for selection may differ in at least the parameters, number of layers and/or types of layers in one or more of the networks.

$$x = \text{lossless}(x)$$

$$f^\circ x = f^\circ \text{lossless}(x) = \text{lossless}(f^\circ x)$$

it follows that:

$$\hat{x} = \text{pre-processing}(x) = \text{lossless}(\text{pre-processing}(x)) = \text{lossless}(f^\circ \text{pre-processing}(x)) = \text{lossless}(\text{pre-processing}(f^\circ x))$$

Figure 12:
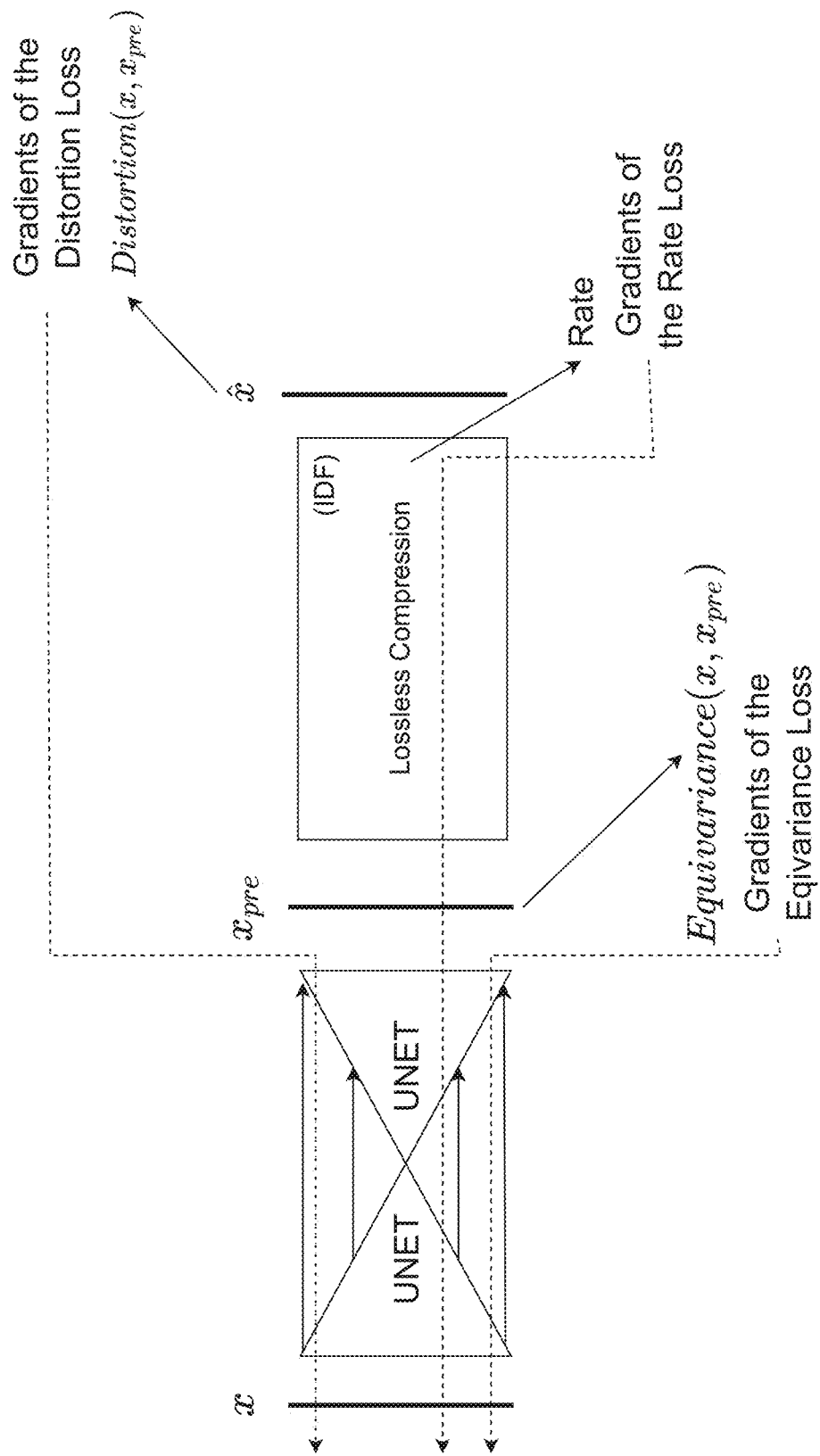
FIG. 12 illustrates a lossy AI-based compression pipeline with an additional equivariance Loss added to the pre-processing.

The training of such a pipeline may be as follows:
1. Create x̂=pre-processing(x)
2. Get Distortion loss: Visual-Loss(x, x̂)
3. (Optional) Get arbitrary equivariance loss:equivariance-Loss (pre-processing ($f^\circ x$), $f^\circ$pre-processing(x))
4. Get Rate loss:rate=Lossless(x̂)
5. Train end-to-end with all losses An example lossy AI-based Compression pipeline with an additional equivariance Loss added to the pre-processing is shown in FIG. 12.

In an alternative, switching the lossless module may be switched with a lossy compression pipeline as discussed above and shown in FIGS. 1 and 2. For example, instead of the arrangement discussed above:

$$\hat{x} = \text{pre-processing}(x) =$$

$$\hat{x} = \text{lossless}(\hat{x})$$

Figure 13:
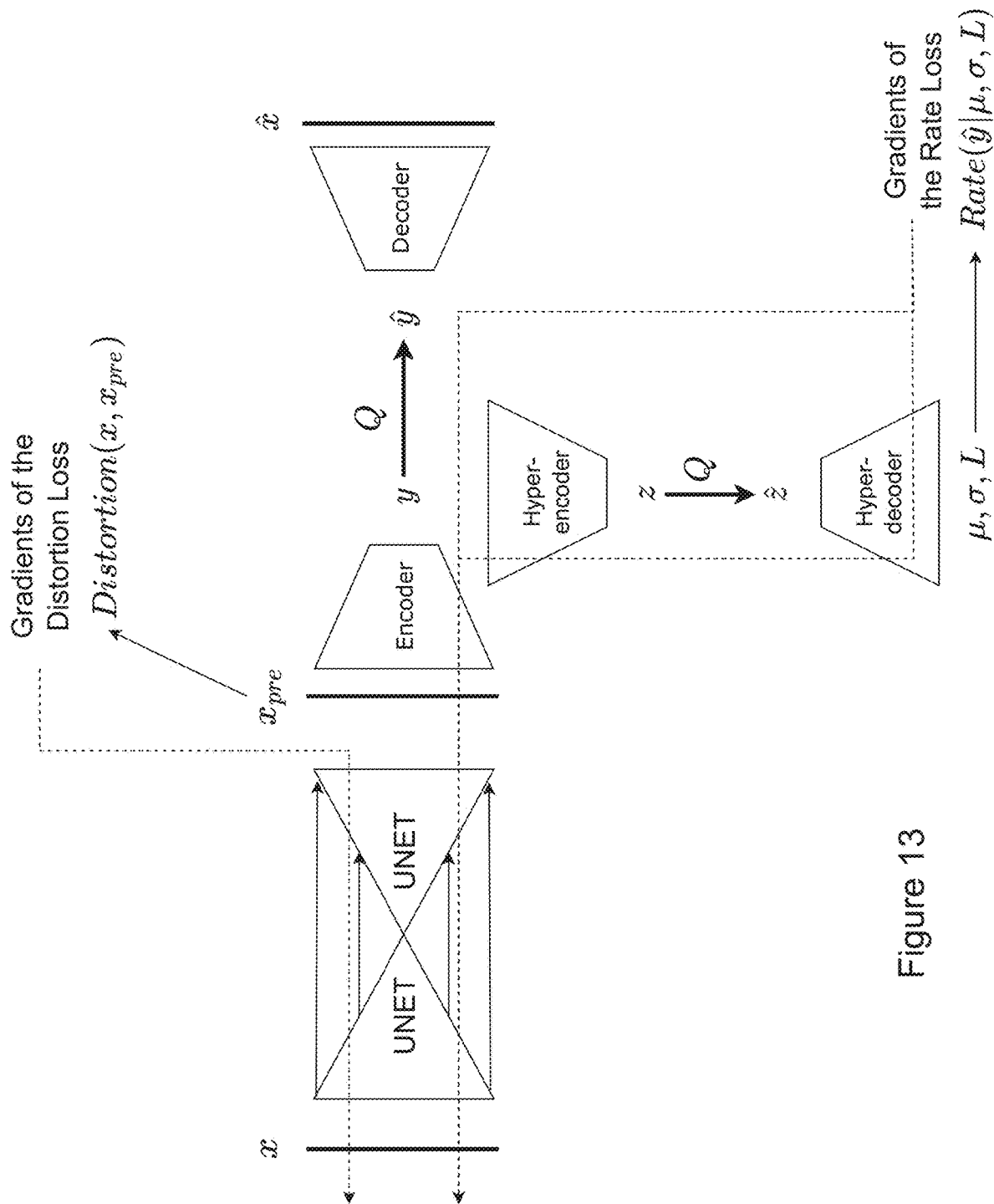
FIG. 13 illustrates a lossy AI-based compression pipeline.

When a lossy compression pipeline is used:

$$x_{pre} = \text{pre-processing}(x)$$

$$\hat{x} = \text{lossy}(x_{pre})$$

Where the lossy module is a lossy compression pipeline. An example of such an arrangement is shown in FIG. 13.

In such an arrangement, there are two sources of distortion in the model. The first comes from the pre-processing module and is "equivariant distortion". The second comes from the AutoEncoder and is "not-equivariant distortion". It is possible to select which distortion source dominates and have the "equivariant-distortion" part of the pre-processing module dominant, for example by enforcing the lossy compression part to behave "semi-lossless" by targeting very low distortion. For instance, suppose we target an MSE of 4 (same as: PSNR of 42) through the correct hyperparameters on the following loss:

$$\text{MSE}(\hat{x}, x_{pre}) = \text{MSE}(\text{lossy}(\text{pre-processing}(x)), \text{pre-processing}(x))$$

In this case, if the pre-processing module is equivariant, the entire pipeline becomes "semi-equivariant". In this case, semi-equivariant may be defined as equivariant up to an MSE of 4. The following example-equation shows how the lossy part leads to an eps, and how this eps is guaranteed to be small under correct regularisation:

$$\hat{x} = \text{lossy}(\text{pre-processing}(f^\circ x)) = \text{lossy}(f^\circ \text{pre-processing}(x)) = f^\circ \text{lossy}(\text{pre-processing}(x)) + \text{eps; eps introduced by the lossy compression}$$

with $$\text{MSE}(f^\circ \text{lossy}(\text{pre-processing}(x)) + \text{eps}, \text{lossy}(\text{pre-processing}(f^\circ x))) < 4.0 \Leftrightarrow \text{MSE}(\text{eps}, 0.0) < 4.0$$

We know that the human eye can not spot equivariance for "small" errors. Thus, as long as we target a sufficiently small MSE between x̂ and '$x_{pre}$', this compression pipeline may be equivariant for the human-visual system.

Ultimately, we have a compression pipeline that can target arbitrary equivariance conditions (by regularising the continuous pre-processing module) and guarantee the equivariance up to an arbitrary limit (e.g. MSE of 4).

Figure 14:
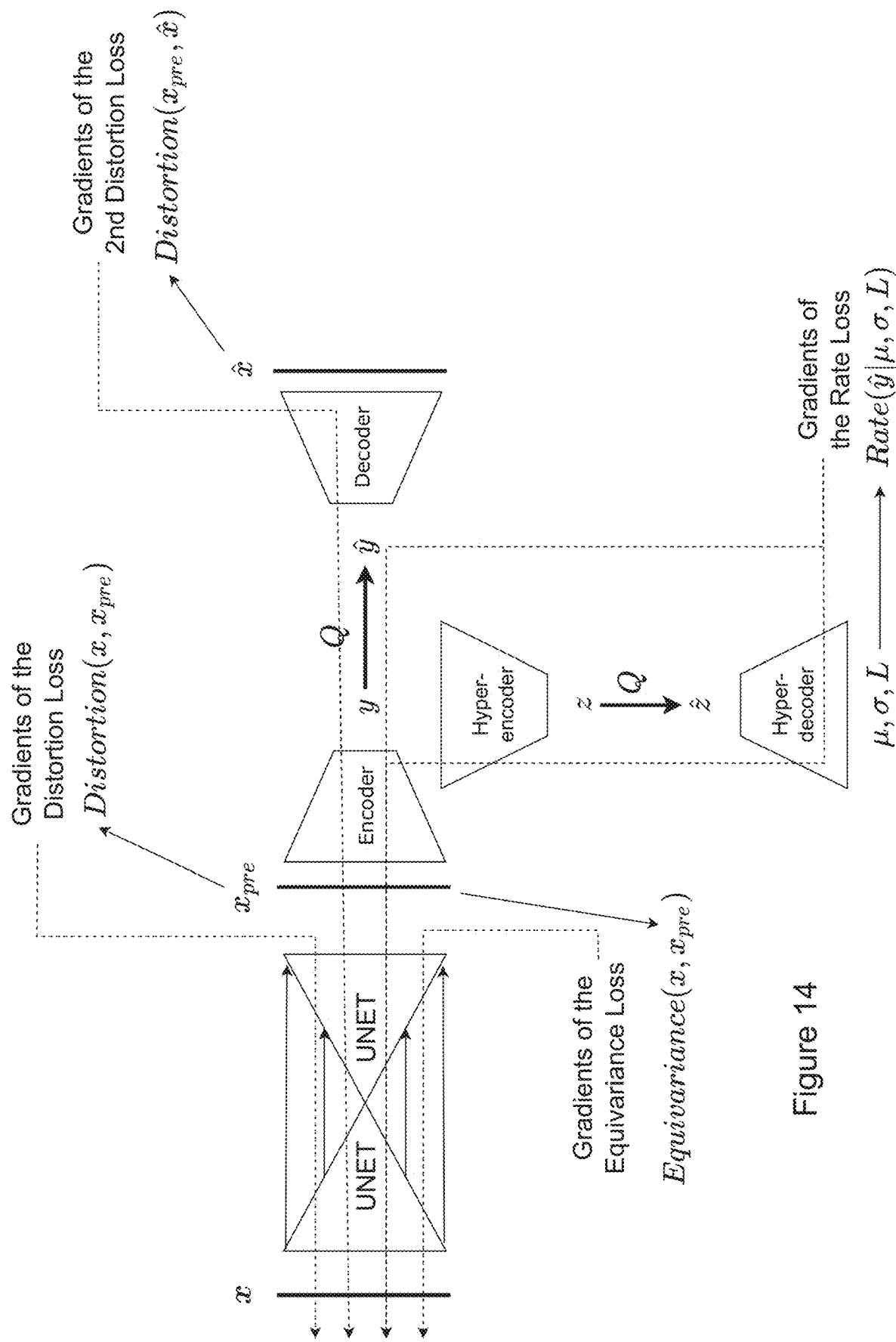
FIG. 14 illustrates a lossy AI-based compression pipeline; with an additional visualisation of losses.

An example of the training of such a pipeline is given below:
1. Create $x_{pre}$=pre-processing(x)
2. Get distortion loss Visual-Loss (x, $x_{pre}$)
3. Get rate loss $\hat{x}$=lossy($x_{pre}$)
4. Get semi-equivariant loss MSE($\hat{x}$,$x_{pre}$)
5. Optionally, get arbitrary equivariance loss: equivariance-Loss(pre-processing($f$°x), $f$°pre-processing(x))
6. Train end-to-end with all losses An example of such a process is shown in FIG. 14.

The examples set out above may be considered in terms of integer enforcement regularisation.

In the case of a lossless compression pipeline, this setup can be interpreted as having no quantisation residuals, as the compression part is lossless. No quantisation residuals can be interpreted as an Integer Enforcement loss only $\xi_y$ with an infinite $\lambda$.

In the case of a lossy compression pipeline, this setup can be interpreted as having minimal quantisation residuals. The $\lambda$ of the distortion loss between $x_{pre}$ and $\hat{x}$ determines the size of the quantisation residual.

Figure 15:
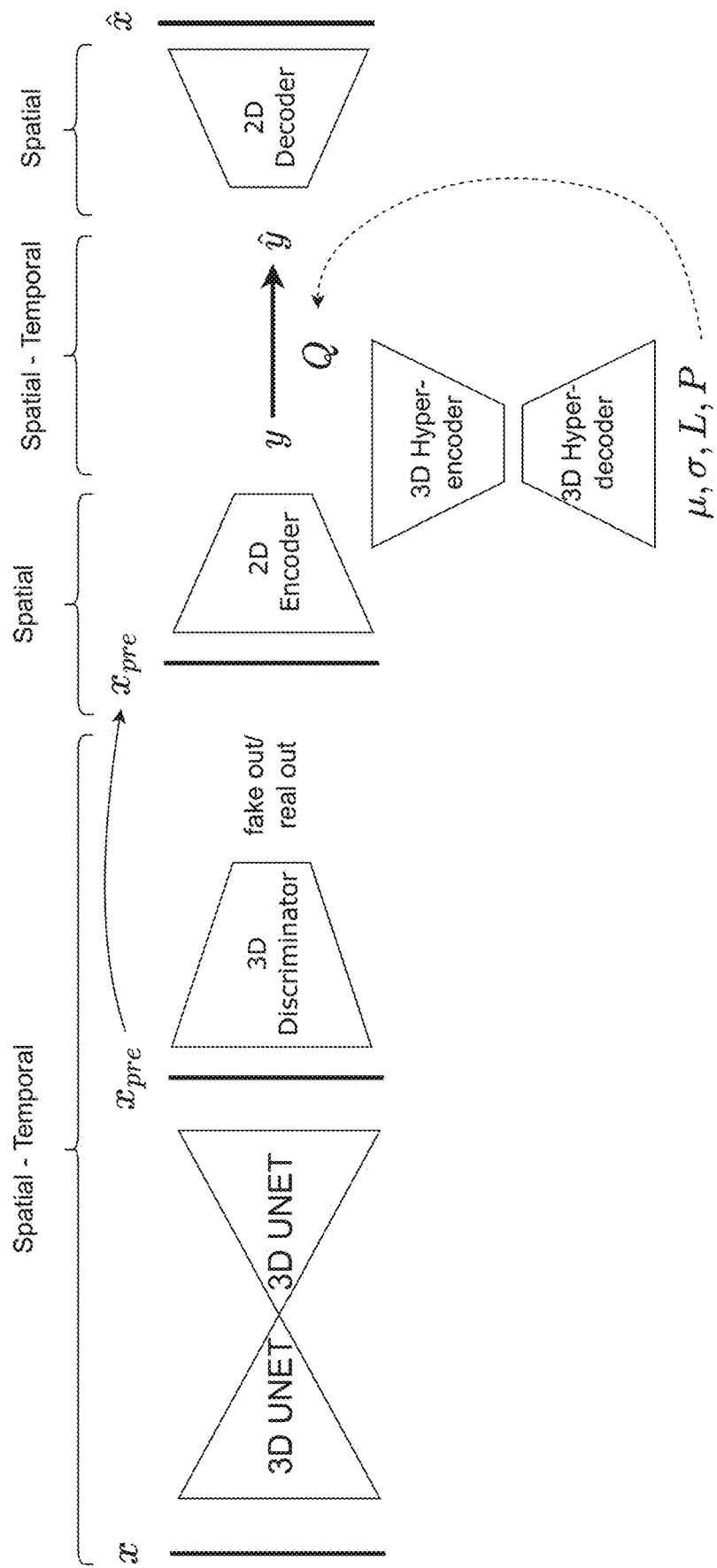
FIG. 15 illustrates and AI-based compression pipeline including 3D convolutions.

The above examples may also include the use of 3D convolutions. In particular, The pre-processing module may act as a Generator in a GAN for the visual loss. The pre-processing module does not run in (decoding) inference; thus, the pre-processing module can be comprised of 3D convolutions. Once the Generator can be a 3D network, the Discriminator can become a 3D network to. An example of such an approach is shown in FIG. 15.

Equivariance may also be enforced on the pre-processing module by one of the following techniques:

A first option is to use an equivariance loss to regularise for translation-equivariance explicitly. We can accomplish this through equivariance-batch training:

MSE(unshift(pre-processing(shift($x$))),pre-processing($x$))

The equivariance-batch may to be used for the pre-processing module, not for the entire compression pipeline.

A second option is to regularise for "true motion", meaning motion that might happen in video sequences. This can be achieved by using Flow networks, defining a strict mask m with a threshold (e.g. MSE=4.0), and using an equivariance loss:

($f_x$,$f_y$)=Flow($x_1$,$x_2$)

$m$=[MSE(warp(pre-processing($x_1$,($f_x$,$f_y$)),$x_2$)<threshold]

MSE($m$·warp(pre-processing($x_1$),($f_x$,$f_y$)),$m$·pre-processing($x_2$))

A third option is to follow the technique of the second option, but extend it to multi-frame flow. For instance:

($f_x$,$f_y$)=Flow($x_1$,$x_2$)

$m$=[MSE(warp(pre-processing($x_1$,($f_x$,$f_y$)),$x_2$)<threshold]

and ($f_x$,$f_y$)=Flow($x_1$,$x_3$)

$m$=[MSE(warp(pre-processing($x_1$,($f_x$,$f_y$)),$x_3$)<threshold]

MSE($m$·warp(pre-processing($x_1$),($f_x$,$f_y$)),$m$·pre-processing($x_3$))

A further example of a distortion loss which may be applied to the above compression pipelines may include the following losses:
1. Visual Loss between x and $x_{pre}$
2. Visual Loss between x and
3. Pixel-Wise similarity loss between $x_{pre}$ and $\hat{x}$
4. Equivariance Loss on x and $x_{pre}$
5. Equivariance Loss on $x_{pre}$ and $\hat{x}$
6. Equivariance Loss on x and $\hat{x}$ The above examples of a pre-processing module may also be modified to use a post processing module. In this case, instead of or in addition to the input image being processed by a pre-processing module as discussed above to obtain an intermediate image, the output of the decoder of an AI-based compression process may be considered to be the intermediate image, and a post-processing module applied at this stage to obtain the output image. The same variations of pre-processing module described above may be applied in a post processing module.

Equivariance

In lossy compression for images and video, small compression artefacts are introduced. When compressing highly similar images (e.g. neighbouring frames in a video, where there's motion present), these artefacts should be consistent between these images. This 'motion consistency' can mathematically be largely framed as equivariance of the compression model.

Let $f$:X→Y be a function that transforms an image to another image. This includes the case of encoders, where the encoded latents can be seen as an image with (usually) more than 3 channels. $X \equiv \mathbb{R}^{C_X \times H_X \times W_X}$ and $Y \equiv \mathbb{R}^{C_Y \times H_Y \times W_Y}$ here denote spaces of images, possibly of different resolutions ($H_X \times W_X$ respectively $H_Y \times W_Y$). and/or number of channels ($C_X$ respectively $C_Y$). X and Y may be considered an input-output pair, where X is the input to a function and Y is the respective output.

Let $T_\delta$:X→X and $\tau_\delta$:Y→Y denote some transformation indexed by $\delta$. Note that this general formulation allows us to define the 'same' transformation in different spaces; the two transformations $T_\delta$ and $\tau_\delta$ should in some sense be 'consistent' with one another. If Y=X, then it can be assumed that $T_\delta = \tau_\delta$.

This formulation may be used to define a translation (shift), where the vector $\delta$=(8, 2) denotes the amount by which the shift is performed. Then $T_\delta$ can be defined such that it shifts its input by 8 pixels in vertical and 2 pixels in horizontal direction (in X-space). If Y has half of the horizontal and vertical resolution, then $\tau_\delta$ should denote a shift by 4 pixels in vertical and 1 pixel in horizontal direction in Y-space.

Transformations of interest include
translations ($\delta$ may denote a 2-dimensional shift vector)
rotations ($\delta$ may denote a rotation angle)
scaling ($\delta$ may denote a scaling factor)
elastic transformations ($\delta$ may denote a 2-dimensional vector field indicating the local displacements)
These may include warping operations, whose flow field was given by an optical flow method.
of images. Again, these need to be defined both on X and Y.

In accordance with the definitions above, a function $f$:X→Y is called equivariant with respect to $\{T_\delta\}_\delta$ and $\{\tau_\delta\}_\delta$, if $f(T_\delta(x))=\tau_\delta(f(x))$ for all x∈X and all δ. For simplicity, we will simply say that e.g. $f$ is translation-equivariant or $f$ is equivariant with respect to translations (etc.), if $T_δ$ and $τ_δ$ describe translations. $f(T_δ(x))$ may be considered a pre-transformed output, because the transformation $T_δ$ is applied before the function $f(x)$ operates to obtain the output. $τ_δ(f(x))$ may be considered a post-transformed output, because the transformation $τ_δ$ is applied after the function $f(x)$ operates to obtain the output.

We will now apply this concept to neural compression methods for images and videos. Then $f:X→Y$ may denote
- a full image compression model
- a full video compression model
- any sub-portion of the above, including
  - an encoder
  - a decoder
  - a hypernetwork consisting of a hyperdecoder and hyperencoder
  - any combination thereof
- a discriminator to be used as a distortion loss
- any learned distortion loss function.

With the presented methods, we wish to enforce these different parts to be equivariant with respect to any of the transformations mentioned above. In practice, this would in particular mean that the compression model does not create inconsistent artefacts between images undergoing a transformation, for example that a compressed video does not experience 'boiling' artefacts between frames.

Anti-Aliasing

One major factor that contributes to non-equivariance of a neural network may be aliasing, which is due to the fact that images, as well as neural networks' feature maps, are represented on a discrete grid (i.e. as pixels). Typically, downsampling in neural networks works by subsampling, which follows a convolution/correlation or a maximum filter (the combined operations are typically called 'strided convolutions' or 'max pooling'). In accordance with sampling theory (Nyquist-Shannon sampling theorem) and according to the principles of digital signal processing, aliasing frequencies above half of the sampling frequency (determined by the image's vertical and horizontal resolution) must be eliminated (via 2D filtering) before subsampling. The filters' parameters determine a trade-off between how many of the (wanted) non-aliasing frequencies are retained, and how well the (unwanted) aliasing frequencies are attenuated.

Anti-aliasing filtering methods may be applied to learned compression models such as those discussed above, as sub-components of a neural network. Such filters parameters may be learned concurrently with the rest of the neural network's parameters.

Any anti-aliasing filter with differentiable parameters may be used. We will call the class of these filters learnable anti-aliasing filters. Examples include, but are not limited to, the following.

Kaiser-windowed sinc filters: In the following, frequencies will be given relative to the sampling frequency, which is determined by the (vertical/horizontal) resolution. Kaiser-windowed sinc filters can be determined in different ways, including combinations of the following:
- (relative) cutoff frequency $f_c$
- ripple parameter $δ$
- shape parameter $β$
- passband width $f_h$ Parameters that are limited to a specific range (or are desired to be within a specific range) can be trained by parameterising these as the output of a differentiable function limited to this range. For example, if $f_c$ should lie in the interval (0,0.5), then $f_c:=0.5 \cdot \text{sigmoid}(\tilde{f}_c)$ for unrestricted $\tilde{f}_c∈\mathbb{R}$ meets this criterion. Then this is a parameter to be optimised during training of the compression model.

Gaussian filters: A Gaussian filter's response is determined by its standard deviation σ, determining its bandwidth.

Sum-of-cosines-windowed sinc filters: Common window functions for sinc filters include sums of cosine functions (which have as special cases Hann and Hamming windows). The summands' coefficients determine the behaviour of the resulting window (and thus filter). These coefficients can be learned as parameters.

Equivariance-Promoting Losses

Let $d_Y:Y×Y→\mathbb{R}$ be some distance-measuring function, e.g. the euclidean metric. We define equivariance-promoting losses (EPL) as losses of the form $$\mathcal{L}_{EPL}^δ(x):=d_Y(f(T_δ(x)),τ_δ(f(x))), \quad (1)$$

a scaled version of which may be added to the total loss of the learned compression model to be optimised.

Possible EPLs include, but are not limited to, the following.
1. EPL, where $f$ denotes a full image compression model
2. EPL, where $f$ denotes a full video compression model
3. EPL, where $f$ denotes any sub-portion of the above, including
   - an encoder
   - a decoder
   - a hypernetwork consisting of a hyperdecoder and hyperencoder
   - any combination thereof
   - the compression of only one frame or a group of frames within a video
4. EPL, where $f$ denotes a discriminator neural network to be used as a distortion loss
5. EPL, where $f$ denotes any learned loss function.

Possible Modifications:

Any of the above methods, where only a portion of the output channels of $f$ is taken into account.

Sub-problems arising from this are
1. Define $T_δ$, and if the resolution in Y differs, define a different $τ_δ$ that behaves 'consistently' with $T_δ$.
2. Define $f$ in such a way that it's easy to make the EPL low (i.e. promote equivariance).
3. How to train with EPLs.
4. Define a good $d_Y$.

Consistent Transformations

For equivariance of $f:X→Y$ with $X≠Y$, two operators $T_δ:X→X$ and $τ_δ:Y→Y$ need to be defined. The challenge is to define those in a way, that they are consistent with one another.

Usually, operations are defined per channel. That is, there is an operator $\tilde{t}_δ:\mathbb{R}^{H_X×W_X}→\mathbb{R}^{H_X×W_X}$, with which the $T_δ$ is defined as $$T_δ:x↦(\tilde{T}_δ(x^1),\ldots,\tilde{T}_δ(x^{C_X})),$$

where $x^i$ denotes the ith channel. The definition is analogous for $τ_δ$.

If one wishes to perform subpixel shifts, the image content between pixels needs to be interpolated. In order to keep interpolation artefacts as small as possible, here we introduce a subpixel shift operator that is trained to perform well particularly with the specific data (e.g. the images in a dataset or extracted features/latents thereof).

The concept is to choose a vertical/horizontal subpixel division $q_H∈\mathbb{N}$ and $q_W∈\mathbb{N}$ (e.g. $q_H=5$ and $q_W=8$ if we want to be able to perform subpixel shifts by multiples of ⅕th of a pixel in vertical and ⅛th of a pixel in horizontal direction.).

The desired downsampling factors may be defined by the architecture. For example if the encoder downsamples by a factor of 4×4 and full pixel shifts are performed in the input, a ¼th pixel shift in the encoder output may be performed.

For a shift of $p_H/q_H$ pixels vertically $p_W/q_W$ pixels horizontally, do the following:

1. Take the Kronecker product of image with learnable upsampling pattern of resolution $q_H \times q_W$. This increases the resolution by factors $q_H \times q_W$. We refer to this space as the subpixel space.
2. Perform filtering in the subpixel space with a learnable anti-aliasing filter.
3. Shift by $(p_H, p_W)$ in the subpixel space.
4. Perform filtering in the subpixel space with a learnable anti-aliasing filter.
5. Subsample by factors $q_H \times q_W$ (and thus get back to the original space).

Note that the final two steps can be combined into one operation (a strided convolution) for further efficiency gains.

This operation is furthered described in Algorithm 1. In the following, we describe how to choose the parameters of the upsampling pattern, as well as the upsampling and downsampling filters.

---

Algorithm 1 Learned subpixel shifting $\tau_\delta = \tau_\delta(P, \theta, v)$

---

Require: vertical/horizontal subpixel division factors $q_H$, $q_W$
Require: upsampling pattern $P \in \mathbb{R}^{q_H \times q_W}$
Require: upsampling anti-aliasing filter $u_\theta$, parameterised by $\theta$
Require: downsampling anti-aliasing filter $d_v$, parameterised by $v$
Input: image channel $x \in \mathbb{R}^{H \times W}$
Input: multiples of subpixel shifts $(p_H, p_W)$ $y \leftarrow P \otimes x$     ▸ upsample by taking Kronecker product with upsampling pattern
    $y \leftarrow u_\theta * y$     ▸ convolve with upsampling filter
    $y \leftarrow T_{(p_H, p_W)}(y)$     ▸ perform full-pixel shift by $(p_H, p_W)$
    $y \leftarrow d_v * y$     ▸ convolve with downsampling filter
    $y \leftarrow y$ supsampled by factors $(q_H, q_W)$
Return: $y$

---

The subpixel shift operator is trained by perform a desired subpixel shift, then performing the same subpixel shift in reverse direction and minimising a loss between the original, unshifted image, and the shifted and then unshifted reconstruction. This is done for the average over a collection of images $x_1, \ldots, x_N$, so that the trainable parameters of this shift operator (P, $\theta$ and v) are optimally tuned for the data. Mathematically, this task is expressed as $$\min_{P,\theta,v} \frac{1}{N} \sum_{i=1}^{N} \|m \odot [\tau_\delta(\tau_{-\delta}(x_i)) - x_i]\|_2^2, \quad (2)$$

where the subpixel shift $\delta$ is chosen randomly for each sample $x_i$. Here, m is a mask which is 0 in the region in which border effects play a role, and 1 everywhere else. The minimisation is performed via stochastic gradient descent.

As an extension, the above can be done for more than one random shift per image. That means that several random shift-unshift operations are performed in succession:

$$\min_{P,\theta,v} \frac{1}{N} \sum_{i=1}^{N} \|m \odot [\tau_{\delta_k}(\tau_{-\delta_k}(\ldots \tau_{\delta_1}(\tau_{-\delta_1}(x_i)))) - x_i]\|_2^2 \quad (3)$$

A lot of image transformations can be described via a flow field, i.e. a vector field which denotes to which location the information stored in a pixel should be displaced when a warping operation is performed. All of the operations described above be framed this way. Note that e.g. scalings, translations and rotations can also be described without specifying the full flow field. The following describes a method for generating an operator $\tau_\delta : C_Y \times H_Y \times W_Y \rightarrow C_Y \times H_Y \times W_Y$ from an operator $T_\delta : C_X \times H_X \times W_X \rightarrow C_X \times H_X \times W_X$ (or vice versa), which is defined via a flow field. The challenge is to apply the same flow to different resolutions ($H_X \times W_X$ versus $H_Y \times W_Y$)

A flow field $\delta$ for a warping operation in X can be represented by a tensor $V_X^\delta \in \mathbb{R}^{2 \times H_X \times W_X}$, where a vertical and horizontal displacement is ascribed to each location. With this, the operator $T_\delta$ may be described as $T_\delta(x)=\text{warp}(V_X^\delta, x)$, where $\text{warp}(V_X^\delta, x)$ denotes some warping operation (e.g. via bilinear interpolation) on x via $V_X^\delta$.

We now describe how to get transform the flow field tensor $V_X^\delta$ for the space X into a flow field tensor $V_Y^\delta$ for the space Y, thereby defining an operator $\tau_\delta(y):=\text{warp}(V_Y^\delta, y)$. Given a resizing method R (e.g. bilinear interpolation, Lanczos resampling), which resizes from resolution $H_X \times W_X$ to $H_Y \times W_Y$, we first resize $$\tilde{V}_Y^\delta \leftarrow R(V_X^\delta).$$

Because resizing leaves the magnitude of the vectors roughly the same, and because the vector field now operates on a changed resolution, the entries of the resized tensor have to be adjusted to the new resolution:

$$V_Y^\delta[1, \ldots] \leftarrow \tilde{V}_Y^\delta[1, \ldots] \cdot H_Y/H_X$$

$$V_Y^\delta[2, \ldots] \leftarrow \tilde{V}_Y^\delta[2, \ldots] \cdot W_Y/W_X, \quad (4)$$

where $[i, \ldots]$ denotes all entries with index i at the first coordinate. Then we define $$\tau_\delta(y):=\text{warp}(V_Y^\delta, y)$$

using the above definitions.

Above, a method was presented how to resample a flow field correctly, using a resizing method and an appropriate scaling. In the following, we present an adapted method with the goal of improving upon the quality of resampling by learning this resampling operation.

Given two frames in a video $x_t$ and $x_{t+1}$ (for time points t and t+1), we calculate the associated latents $y_t=\text{Enc}(x_t)$ and $y_{t+1}=\text{Enc}(x_{t+1})$ by encoding via the encoder function Enc. Additionally, a flow field $$V_X^\delta \leftarrow O(x_t, x_{t+1})$$

is estimated using an optical flow method O. The goal is to learn a function $g_\theta : \mathbb{R}^{2 \times H_X \times W_X} \rightarrow \mathbb{R}^{2 \times H_Y \times W_Y}$, which we will apply to generate a flow field $$V_Y^\delta = g_\theta(V_X^\delta).$$

The associated latent at time t+1, assuming that they differ only by the warping of the flow field, is then $\tilde{y}_{t+1} = \text{warp}(V_Y^\delta, y_t)$.

With this, the resampling operator training task $$\min_\theta d(m \odot Dec(\tilde{y}_{t+1}), m \odot Dec(y_{t+1}))$$

is solved at the same time as the training task of the compression pipeline. This can be e.g. by alternating the gradient updates of these two loss functions. m is here a binary mask or a weighting function that can take into account the occlusion in an image.

The function $g_\theta$ is realised as a neural network (where $\theta$ denotes the trainable parameters of the network).

Let $T_\delta$ denote a transformation, defined on each channel. Let $P: \mathbb{R}^{1 \times H \times W} \to \mathbb{R}^{NM \times H/N \times W/M}$ denote a bijection, where N divides H and M divides W. Then we define a transformation under basis change $\tau_\delta : x \mapsto P(T_\delta(P^{-1}(x)))$.

Bijections P can include (possibly repeat applications of):
Pixel shuffling upsampling/downsampling
(Inverse) Wavelet transforms, including multi-resolution analysis
(Inverse) discrete sine/cosine transform
Learnable invertible transforms.

This allows changing e.g. a shift operator in X (i.e. $T_\delta$) into an entirely different operation in Y (i.e. $\tau_\delta$), such as permuting channels (in the case that P denotes a pixel shuffle operation).

For (for instance) translations, scaling, rotations or elastic transformations, the operation is implicitly required to 'fill in' information from outside of the image. E.g. if an image is shifted 5 pixels to the left, an idealised shift operator would have to shift 5 pixels from right of the image border into the image. This region can be filled in e.g. with zeroes, or be continued some other way (reflection or replication of border pixels etc).

Alternatively, one may define binary masks (consisting of only 0s and 1s), which are multiplied element-wise (denoted via $\odot$):

$$d_Y(m \odot f(M \odot T_\delta(x))), m \odot \tau_\delta(f(x))) \quad (5)$$

In the following, we will describe how to use EPLs as part of the training procedure for training neural compression pipelines. Let $\mathcal{L}_{compr}(x)$ be a loss that is used to train a neural compression model on some image or video x. This will typically contain rate and distortion terms.

We now extend this to $$\mathcal{L}_{total} := \mathcal{L}_{compr}(x) + \lambda \cdot \mathcal{L}_{EPL}^\delta(x), \quad (6)$$

where $\mathcal{L}_{EPL}^\delta(x)$ is some variation of EPL (e.g. normalised EPL, with border handling etc), and $\lambda > 0$ is some hyperparameter. For each x, a different random $\delta$ (according to a pre-defined random distribution over $\delta$) is chosen. Note that this random choice of $\delta$ defines two (possibly different) transforms $T_\delta$ and $\tau_\delta$.

Take an encoder network $f: X \to Y$, where $X = \mathbb{R}^{3 \times 256 \times 256}$ and $Y = \mathbb{R}^{12 \times 64 \times 64}$, which hence downsamples the input by a factor of 4 in both vertical and horizontal direction. Let $\delta$ be distributed according to a uniform distribution over $I \times I$, where $I := \{-4, -3, \ldots, 2, 3\}$. Then $T_\delta$ may be defined as a full-pixel shift by $\delta$ (i.e. random full pixel translation in vertical and horizontal direction from minimum $-4$ to maximum 3). In order to make the corresponding $\tau_\delta$ (which should operate in the downsampled space) consistent, one can define it as a learnable subpixel translation operator as defined above, where $q_H = q_V = 4$, according to the downsampling factor of the encoder. Then $(p_H, p_W) = (\delta_1, \delta_2)$, such that a full-pixel translation in the input of the encoder by randomly chosen $(\delta_1, \delta_2)$ corresponds to a subpixel shift by $(\delta_1/4, \delta_2/4)$ in the output of the encoder.

Because some distance-measuring functions $d_Y: Y \times Y \to \mathbb{R}$ also depend on the magnitude of their input (e.g. the euclidean metric), for some EPLs it may be a good idea to normalise, for example via $$\frac{d_Y(f(T_\delta(x)), \tau_\delta(f(x)))}{\|f(x)\|^k + \varepsilon}, \quad (7)$$

where $\|\cdot\|$ denotes a vector norm, k is some number and $\varepsilon > 0$ is a small stabilisation constant.

Equivariance-Aware Quantisation

One of the key sources of non-equivariance in a compression pipeline is the quantisation of the latent representation of the image. Quantisation discretises the latent space and introduces information loss in the signal sent to the receiver. The discretisation step introduces aliasing in the output values in addition to the spatial aliasing already present. The measure of the information loss is the residual, which is defined to be the difference $y - \hat{y}$. Here, y denotes the latent and $\hat{y}$ denotes the quantised latent. Large quantisation residuals indicate that small transformations in the latent y result in very different quantised representations due to large rounding errors. In turn, the differences in quantised latents translate to visible variations in the decoded images (e.g. 'boiling' artefacts) which break the equivariance of the pipeline. To promote equivariance it is therefore necessary to reduce the size of quantisation residuals and to reallocate them across the latent.

Additionally the gradients of the rounding function are zero almost anywhere and therefore the standard training mechanism using backpropagation has limited capacity to counteract non-equivariance introduced by the quantisation.

Quantization bin sizes 8 may be learned during training and predicted using a hypernetwork in addition to other parameters as discussed above. EPLs may be used in such a system with learned quantisation to improve the accuracy of the quantisation bins predicted by the system.

Smooth quantisation proxies are smooth functions that approximate the discontinuous rounding function. Examples of smooth quantisation approximations include (but are not limited to):

1. $\sigma(x) = x + c \sin(2\pi x)$, where $c \in \left[0, \frac{1}{2\pi}\right]$.

2. $\sigma(x) = (\text{round} * K)(x)$, where K is a smoothing kernel (e.g. Gaussian bell curve).
3. A pretrained neural network trained to mimic the rounding function.
4. A neural network quantisation proxy trained in an end-to-end fashion as part of the compression pipeline.

They can be applied in the compression pipeline to promote equivariance in two ways 1. Using a smooth quantisation proxies as activation functions in various parts of the network allows the outputs to better approximate their rounded counterparts which in turn implies a smaller quantisation residual.

2. Smooth rounding proxies can be used at training time of the neural network in place of the discontinuous rounding function. This allows the propagation of EPL gradients throughout the network and therefore makes it possible to adapt the network to the (approximate) rounding operation.

Let $d_Y: Y \times Y \to \mathbb{R}$ be any distance-measuring function. A quantisation-aware regularisation penalty is a loss term of the form $$d_Y(y, \text{sg}(\hat{y})), \quad (8)$$

where $\hat{y}$ is the latent quantised using any quantisation scheme and sg is the stop-grad operation. A scaled version of which are added to the total loss of the learned compression model to be optimised. This loss can be applied to any tensor in the neural network to encourage the tensor to more closely resemble its quantised counterpart, thereby minimising the quantisation residual. These include:
1. latents and hyper-latents (y, z, w),
2. transformed latents ($\xi_y, \xi_z, \xi_w$).

the definition of the residuals is $$\xi_y = \frac{y - \mu_y}{\Delta_y} \quad (9)$$

and is analogous for the other latents.

The rounded latent $\hat{y}$ can be viewed as the true latent y corrupted by quantisation noise. Removing the noise by postprocessing the quantised latent before passing it to the decoder. Denoising the quantised latent can be achieved using:
1. Standard image denoising filters.
2. Neural image denoising algorithms (such as denoising auto-encoders).

The problem of quantisation residuals can be addressed by sending the residuals as side-information to aid reconstruction on the decoding side.

Concept: For a given channel c the residual $$\text{res} = y[c, \ldots] - \hat{y}[c, \ldots] \quad (10)$$

can be compressed using a separate compression method and sent as meta-data. This method can be used for any choice of channels of the latent y. In practice, the most relevant channel can be determined based on criteria including the concentration of information in a channel, sensitivity analysis of EPLs or any metric differentiating between the channels. The selected channels together with the residuals for the channels are sent as metadata. At decoding time, the residual is added to the quantised latent $$\hat{y}_{final}[c, \ldots] = \hat{y}[c, \ldots] + \text{res}, \quad (11)$$

which is then decoded using a decoder network.

The compression methods that can be used to compress the residual include
1. Rounding the residual to a specified number of significant digits and applying integer compression algorithms.
2. A separate artificial neural network compression algorithm.

The size of the side-information can be further reduced by restricting the range of the selected residual channel to a pre-specified range.

A possible extension of this approach is to restrict the spatial range of the residual instead of sending the entire channel. The necessary side information in this case includes the description of the spatial range (for example, a bounding box) and the residual at the specified spatial location.

The learnt bins control the quantisation resolution of the latent space in the model. To achieve a different trade-off between rate and equivariance the learnt bins can be readjusted on a per image basis.

For a specified channel c the learnt bins for that channel we rescale the learnt bins of that channel by a scale factor $\lambda$ $$\Delta_{new}[c, \ldots] = \lambda \Delta[c, \ldots], \quad (12)$$

while the remaining channels are the same in $\Delta_{new}$ and $\Delta$. The latent is then quantised with the rescaled learnt bins and the channel c and $\lambda$ are sent as metadata. At decoding, the predicted $\Delta$ is scaled in the same way as above and $\Delta_{new}$ is used in reconstructing the rounded latent. The considerations regarding the choice of the channels mentioned in the previous innovation apply here as well.

As a possible extension of this method a different choice of the scale factor can be made for different spatial locations in latent channels. In this case the spatial region delimiters and the corresponding factors are sent as metadata.

Encoding Flow Residuals

In this section we describe an additional component to the previously described video compression framework that allows us to pass extra information in the bitstream to achieve equivalent video reconstruction. The equivariance is achieved by passing the differences in pixel values that constitute non-equivariance directly in the bit-stream. The method uses optical flow, which may be defined by an optical flow field, to identify the motion of the scene context in the video between the frames and the areas of the current frame present in the previous frames. The residuals in these areas are then calculated, passed in the bitstream and used in the decoding time to obtain equivariant video reconstruction.

Assume that we have a sequence of frames: $x_0, x_1, \ldots, x_n$, and their equivalent reconstructions from a video compression pipeline with encoder $f_\theta$ and decoder $g_\theta$, $\hat{x}_0, \hat{x}_1, \ldots, \hat{x}_n$.

Here we describe how the equivariant-encoding residuals are calculated for two frames $x_{t-1}, x_t$. We start by calculating the optical flow between the ground truth frames, $$V_x^\delta \leftarrow O(x_{t-1}, x_t), \quad (13)$$

where $V_x^\delta \in \mathbb{R}^{2 \times H_X \times W_X}$ is an optical flow from frame $x_{t-1}$ to $x_t$. Now, given this, we can align the previous reconstruction frame $\hat{x}_{t-1}, \hat{x}_t$, by warping $\hat{x}_{t-1}$ with flow $V_x^\delta$:

$$w_t, m = \text{warp}(\hat{x}_{t-1}, V_x^\delta), \quad (14)$$

where $\text{warp}(x, V_x^\delta)$—some warping operation (e.g. via bilinear interpolation) on x via field $V_x^\delta$, and $m \in \mathbb{B}^{H_X \times W_X}$—binary map of preserved information $m_{ij}=1$ indicates the $ij^{th}$ pixel of the image contains information present in x and $m_{ij}=0$ indicates that the information for $ij^{th}$ pixel of the image is missing.

The new image $w_t$ can be seen as a prediction of the current reconstructed frame where the information present in $\hat{x}_{t-1}$ is aligned to be in the same spatial location as in $\hat{x}_t$. The non-equivariance between the two reconstructed frames is now can be quantified by calculating residuals.

$$r_t = w_t - \hat{x}_t \quad (15)$$

We call these residuals $r_t$ equivariance-encoding residuals.

---
Algorithm 2 Algorithm for calculating equivariance-encoding residuals for the frame $x_t$
---
Require: warp function W
Require: flow function O
Input: original frames $x_{prev}$, $x_{current}$
Input: reconstruction obtained from the standard compression pipeline $\hat{x}_{prev}$, $\hat{x}_{current}$
    $v_t^\delta \leftarrow O(x_{prev}, x_{current})$     ▸ estimate optical flow $F_t$ using ground truth frames
    $w, m \leftarrow warp(\hat{x}_{prev}, v_t^\delta)$   ▸ alig $\hat{x}_{prev}$ with $\hat{x}_{current}$ using with flow $v_t^\delta$ and get the map of preserved information
    $r \leftarrow m(w - \hat{x}_{current})$   ▸ calculate equivariance residuals for the areas of preserved information
    Return: r
---

We propose to using a residual compression model, encoder $f_\phi$ and decoder $g_\phi$, and pass them in the bitstream along with the current frame. At the decoding time we can use reconstructed residuals $\hat{r}_t$ to obtained final reconstructed frame $\hat{x}_t^{final}$:

$$\hat{x}_t^{final} = \hat{x}_t + \hat{r}_t. \quad (16)$$

where $\lambda_{res}$ is the coefficient controlling the strength of minimisation of the residuals r. Adding this element into the loss ensure the minimisation of the residuals and trains the video compression network to produce more equivariant images.

---
Algorithm 3 Algorithm of compression pipeline combined with equivariance-encoding residuals
for the video sequence $x_0, \ldots, x_n$. For simplicity this algorithm ignores the entropy modelling
module and quantisation usually used in a compression pipeline
---
Require: Function for calculating equivariance-encoding residuals res
Require: Frame Encoder function $f_\theta$
Require: Frame Decoder function $g_\theta$
Require: Residual Encoder function $f_\phi$
Require: Residual Decoder function $g_\phi$
Input: Video sequence of frames to be encoded $x_0, \ldots, x_n$
    ▸ Compress the first frame $x_0$ using standard compression pipeline
  Encoding time
    $y_0 \leftarrow f_\theta(x_0)$   ▸ calculate the latent $y_t$ of the current frame
  Decoding time
    $\hat{x}_0 \leftarrow g_\theta(y_0)$   ▸ get the reconstructed frame $\hat{x}_t$
    $\hat{x}_0^{final} \leftarrow \hat{x}_0$
    ▸ Compress the rest of the frames with equivariance-encoding residuals
  For t in 1 : n do
    Encoding time
    $y_t \leftarrow f_\theta(x_t)$   ▸ calculate the latent $y_t$ of the current frame
    $\hat{x}_0 \leftarrow g_\theta(\hat{y}_t)$   ▸ get the reconstructed frame $\hat{x}_t$
    $r_t \leftarrow res(x_{t-1}, x_t, \hat{x}_{t-1}^{final}, \hat{x}_t)$   ▸ calculate equivariance-encoder residuals using alg. 2
    $ry_t \leftarrow f_\phi(r_t)$   ▸ calculate the latent $ry_t$ of the equivariance-encoder residuals
    Decoding time
    $\hat{x}_t \leftarrow g_\theta(\hat{y}_t)$   ▸ get the reconstructed frame $\hat{x}_t$
    $\hat{r}_t \leftarrow g_\phi(\hat{ry}_t)$   ▸ get the reconstructed equivariance-encoder residuals $\hat{r}_t$
    $\hat{x}_t^{final} \leftarrow \hat{x}_t + \hat{r}_t$   ▸ get the final prediction by adding $\hat{x}_t$ and $\hat{r}_t$
---

We propose a training procedure in which the video compression model and the residual compression model described above are trained together. Where the rate-distortion loss function is amended to include the bit-rate of the residuals.

$$\mathcal{L}(x,r,\hat{y},\hat{ry}) = E_{x \sim p_x}[\lambda_{rate_f} R(\hat{y}) + \lambda_{rate_r} R(\hat{ry})] + d_f(x,\hat{x}) + d_{res}(r,\hat{r})]. \quad (17)$$

where R is the rate calculation function, $\lambda_{rate_f}$ and $\lambda_{rate_r}$—coefficients controlling rate of the frame and residuals respectively, $d_f$—distortion function responsible for the duality of the frame reconstruction and $d_{res}$—distortion function for residuals.

Another variation of the training procedure includes modifying the rate-distortion loss to minimise the residuals explicitly.

$$\mathcal{L}(x,r,\hat{y},\hat{ry}) = E_{x \sim p_x}[\lambda_{rate_f} R(\hat{y}) + \lambda_{rate_r} R(\hat{ry})] + d_f(x,\hat{x}) + d_{res}(r,\hat{r}) + \lambda_{res}(r)], \quad (18)$$

We purpose a modification of the previous method where rather than calculating residuals between two consecutive frames we calculate residuals between warped I-frame and the current frame.

Assume that we have a sequence of frames: $x_0, x_1, \ldots, x_n$, and their equivalent reconstructions, $\hat{x}_0, \hat{x}_1, \ldots, \hat{x}_n$ using a video compression pipeline with encoder $f_\theta$ and decoder $g_\theta$. Let $x_0$ to be an I frame that marks a scene change in the video and is compressed independently and $x_1, \ldots, x_n$ be P-frames that are compressed dependently of the I-frame. This modifies eqns. 13 and 14 to be:

$$V_X^\delta \leftarrow O(x_0, x_t). \quad (19)$$

$$w_t, m = warp(\hat{x}_0, V_X^\delta). \quad (20)$$

Utilising this methods negates potential distortions occurring due to accumulation of error that might be present in estimation of optical flow and warping function using functions O and W.

Algorithm 4 Algorithm of compression pipeline combined with equivariance-encoding
residuals for the video sequence $x_0, \ldots, x_n$. For simplicity this algorithm ignores the
entropy modelling module and quantisation usually used in a compression pipeline

---

Require: Function for calculating equivariance-encoding residuals res
Require: Frame Encoder function $f_\theta$
Require: Frame Decoder function $g_\theta$
Require: Residual Encoder function $f_\phi$
Require: Residual Decoder function $g_\phi$
Input: Video sequence of frames to be encoded $x_0, \ldots, x_n$
       ▸ Compress the first frame $x_0$ using standard compression pipeline
 Encoding time
 $y_0 \leftarrow f_\theta(x_0)$     ▸ calculate the latent $y_t$ of the current frame
 Decoding time
 $\hat{x}_0 \leftarrow g_\theta(y_0)$     ▸ get the reconstructed frame $\hat{x}_t$
      ▸ Compress the rest of the frames with equivariance-encoding residuals
 For t in 1 : n do
  Encoding time
  $y_t \leftarrow f_\theta(x_t)$    ▸ calculate the latent $y_t$ of the current frame
  $\hat{x}_t \leftarrow g_\theta(\hat{y}_t)$    ▸ get the reconstructed frame $\hat{x}_t$
  $r_t \leftarrow \text{res}(x_0, x_t, \hat{x}_0, \hat{x}_t)$ ▸ calculate equivariance-encoder residuals using alg. 2
  $ry_t \leftarrow f_\phi(r_t)$  ▸ calculate the latent $ry_t$ of the equivariance-encoder residuals
  Decoding time
  $\hat{x}_t \leftarrow g_\theta(\hat{y}_t)$    ▸ get the reconstructed frame $\hat{x}_t$
  $\hat{r}_t \leftarrow g_\phi(\hat{ry}_t)$  ▸ get the reconstructed equivariance-encoder residuals $\hat{r}_t$
  $\hat{x}_t^{final} \leftarrow \hat{x}_t + \hat{r}_t$  ▸ get the final prediction by adding $\hat{x}_t$ and $\hat{r}_t$

---

In this section we present a modification of the methods described in this section, where the equivariance-encoding residuals are calculated at the decoding time using optical flow that is compressed and passed in the bitstream.

This modification can be applied to both methods described above—and be applied to the previous frame and to the I-frame in the video sequence.

---

Algorithm 5 Algorithm of compression pipeline combined with optical-flow encoding for the
video sequence $x_0, \ldots, x_n$. For simplicity this algorithm ignores the entropy modelling module
and aquantisation usually used in compression pipeline

---

Require: Method for calculating optical flow O
Require: Warping operation warp
Require: Frame Encoder function $f_\theta$
Require: Frame Decoder function $g_\theta$
Require: Optical Encoder function $f_\psi$
Require: Optical Decoder function $g_\psi$
Input: Video sequence of frames to be encoded $x_0, \ldots, x_n$
       ▸ Compress the first frame $x_0$ using standard compression pipeline
 Encoding time
 $y_0 \leftarrow f_\theta(x_0)$     ▸ calculate the latent $y_t$ of the current frame
 Decoding time
 $\hat{x}_0 \leftarrow g_\theta(y_0)$     ▸ get the reconstructed frame $\hat{x}_t$
 $\hat{x}_0^{final} \leftarrow \hat{x}_0$
      ▸ Compress the rest of the frames with optical flow encoding
 For t in 1 : n do
  Encoding time
  $y_t \leftarrow f_\theta(x_t)$    ▸ calculate the latent $y_t$ of the current frame
  $\hat{x}_t \leftarrow g_\theta(\hat{y}_t)$    ▸ get the reconstructed frame $\hat{x}_t$
  $v_t^\delta \leftarrow O(x_{t-1}, x_t)$  ▸ calculate optical flow
  $vy_t \leftarrow f_\psi(\hat{v}_t^\delta)$  ▸ calculate the latent $vy_t$ of the optical flow
  Decoding time
  $\hat{x}_t \leftarrow g_\theta(\hat{y}_t)$    ▸ get the reconstructed frame $\hat{x}_t$
  $\hat{v}_t^\delta \leftarrow g_\psi(\hat{vy}_t)$  ▸ get the reconstructed optical flow
  $w_t, m \leftarrow \text{warp}(\hat{x}_{t-1}^{final}, \hat{v}_t^\delta)$ ▸ get the aligned image and the map of preserved information
  $\hat{x}_t^{final} \leftarrow (1-m)\hat{x}_t + mw_t$ ▸ get the final prediction by combining $\hat{x}_t$ and $w_t$

---

The subject matter and the functional operations described in this specification can be implemented in digital electronic circuitry, in tangibly-embodied computer software or firmware, in computer hardware, including the structures disclosed in this specification and their structural equivalents, or in combinations of one or more of them. The subject matter described in this specification can be implemented as one or more computer programs, i.e., one or more modules of computer program instructions encoded on a tangible non transitory program carrier for execution by, or to control the operation of, data processing apparatus. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them. The computer storage medium is not, however, a propagated signal.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a stand alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Computers suitable for the execution of a computer program include, by way of example, can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a VR headset, a game console, a Global Positioning System (GPS) receiver, a server, a mobile phones, a tablet computer, a notebook computer, a music player, an e-book reader, a laptop or desktop computer, a PDAs, a smart phone, or other stationary or portable devices, that includes one or more processors and computer readable media, or a portable storage device, e.g., a universal serial bus (USB) flash drive, to name just a few.

Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

The subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should be construed as descriptions of features that may be specific to particular examples of particular inventions. Certain features that are described in this specification in the context of separate examples can also be implemented in combination in a single example. Conversely, various features that are described in the context of a single example can also be implemented in multiple examples separately or in any suitable subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the examples described above should not be understood as requiring such separation in all examples, and it should be understood that the described program components and systems can generally be integrated together in a single software product or packaged into multiple software products.

We claim:

1. A method of training one or more neural networks, the one or more neural networks being for use in lossy image or video encoding, transmission and decoding, the method comprising the steps of:

receiving an input image at a first computer system;

encoding the input image using a first neural network to produce a latent representation;

performing a quantization process on the latent representation to produce a quantized latent; and decoding the quantized latent using a second neural network to produce an output image, wherein the output image is an approximation of the input image;

evaluating a loss function based on a difference between the output image and the input image;

evaluating a gradient of the loss function;

back-propagating the gradient of the loss function through the first neural network and the second neural network to update the parameters of the first neural network and the second neural network; and repeating the above steps using a set of input images to produce a first trained neural network and a second trained neural network;

wherein the loss function additionally comprises a term based on a difference between a pre-transformed output and a post-transformed output;

wherein the pre-transformed output is an output of an input-output pair of the method of training one or more neural networks where a transformation has been applied to the input; and the post-transformed output is an output of the input-output pair where a corresponding transformation to the transformation applied to obtain the pre-transformed output has been applied to the output.

2. The method of claim 1, wherein the input-output pair is the input image and the output image.

3. The method of claim 1, wherein the input-output pair is the input image and the latent representation.

4. The method of claim 1, wherein the input-output pair is the quantized latent received by the second computer system and the output image.

5. The method of claim 1, further comprising the steps of:
encoding the latent representation using a third neural network to produce a hyper-latent representation;
performing a quantization process on the hyper-latent representation to produce a quantized hyper-latent; and
decoding the quantized hyper-latent using a fourth neural network;
wherein the output of the fourth trained neural network is used during the decoding of the quantized latent; and
the input-output pair is the latent representation and the output of the fourth trained neural network.

6. The method of claim 1, wherein the method is repeated for a plurality of frames of an input video to obtain a plurality of output frames; and
the input-output pair is the plurality of frames of the input video and the plurality of output frames.

7. The method of claim 1, wherein the transformation and the corresponding transformation are applied to a subset of the channels of the input-output pair.

8. The method of claim 1, wherein the input of the input-output pair is at a first resolution and the output of the input-output pair is at a second resolution, where the first resolution and the second resolution are different; and the method further comprises the following steps:
prior to applying the transformation or corresponding transformation to the input or output with the smaller resolution, upsampling the smaller resolution input or output; and
after applying the transformation or corresponding transformation to the upsampled input or output, downsampling the upsampled input or output.

9. The method of claim 8, wherein the smaller resolution input or output is upsampled to correspond to the resolution of the other of the input or output.

10. The method of claim 1, wherein the transformation or corresponding transformation comprises a basis change.

11. The method of claim 10, wherein the basis change is a bijection.

12. The method of claim 10, wherein the basis change comprises at least one of the following operations: a pixel shuffle upsample, a pixel shuffle downsample, a wavelet transform, an inverse wavelet transform, a discrete sine or cosine transformation, an inverse discrete sine or cosine transformation and a learnable invertible transformation.

13. The method of claim 1, further comprising applying zero values to undefined pixels created in the input or output by applying the transformation or corresponding transformation.

14. The method of claim 1, further comprising applying the value of adjacent defined pixels to undefined pixels created in the input or output by applying the transformation or corresponding transformation.

15. The method of claim 1, wherein the transformation and the corresponding transformation are identical.

16. The method of claim 1, wherein the transformation is different to the corresponding transformation.

17. The method of claim 1, wherein the transformation and the corresponding transformation are retained for each repetition of the method.

18. The method of claim 1, wherein the transformation and the corresponding transformation are selected from a random distribution for each repetition of the method.

19. A method for lossy video encoding, transmission and decoding, the method comprising the use of one or more neural networks trained according to claim 1.

20. A data processing system configured to perform the method of claim 1.

* * * * *